United States Patent
Ishikawa et al.

(10) Patent No.: US 7,895,612 B2
(45) Date of Patent: Feb. 22, 2011

(54) DISK LOADING DEVICE HAVING POSITIONING AND DETECTION LEVERS THAT MOVE ENTIRELY OUTSIDE AN OUTERMOST CIRCUMFERENCE OF AN AREA OCCUPIED BY A DISK MOUNTED THEREIN

(75) Inventors: Kazuo Ishikawa, Hyogo (JP); Norikatsu Yoshida, Hyogo (JP); Yukio Morioka, Osaka (JP); Takuto Yamazaki, Nara (JP)

(73) Assignee: Panasonic Corporation, Osaka (JP)

( * ) Notice: Subject to any disclaimer, the term of this patent is extended or adjusted under 35 U.S.C. 154(b) by 902 days.

(21) Appl. No.: 11/792,845

(22) PCT Filed: Dec. 13, 2005

(86) PCT No.: PCT/JP2005/022868

§ 371 (c)(1), (2), (4) Date: Jun. 12, 2007

(87) PCT Pub. No.: WO2006/064798

PCT Pub. Date: Jun. 22, 2006

(65) Prior Publication Data

US 2008/0141288 A1 Jun. 12, 2008

(30) Foreign Application Priority Data

Dec. 13, 2004 (JP) ............................. 2004-360392

(51) Int. Cl.
*G11B 17/04* (2006.01)
*G11B 33/12* (2006.01)

(52) U.S. Cl. ...................................... 720/626; 720/652
(58) Field of Classification Search ................. 720/601, 720/606, 618–633, 645, 656, 641, 642, 652
See application file for complete search history.

(56) References Cited

U.S. PATENT DOCUMENTS

| 4,498,162 | A | 2/1985 | Schatteman |
| 2002/0136138 | A1* | 9/2002 | Chang et al. ............... 369/75.1 |
| 2003/0161243 | A1* | 8/2003 | Tuchiya ..................... 369/77.1 |

FOREIGN PATENT DOCUMENTS

| BE | 892 952 | 8/1982 |
| JP | 5-282761 | 10/1993 |

(Continued)

OTHER PUBLICATIONS

Supplementary European Search Report (in English language) issued Feb. 2, 2009 in European Application No. 05816746.1.

*Primary Examiner*—Craig A. Renner
*Assistant Examiner*—Gustavo Polo
(74) *Attorney, Agent, or Firm*—Wenderoth, Lind & Ponack, L.L.P.

(57) ABSTRACT

Two positioning levers for positioning a disk and two detecting levers are provided outside an area in a disk loading device where the disk is to be mounted. A large-diameter disk is positioned when both of the two detecting levers come in contact with the disk. At the time of insertion of a small-diameter disk when one of the detecting levers comes in contact with the disk, the two positioning levers do not move and the small-diameter disk is positioned.

8 Claims, 29 Drawing Sheets

FOREIGN PATENT DOCUMENTS

| | | |
|---|---|---|
| JP | 7-50057 | 2/1995 |
| JP | 8-212655 | 8/1996 |
| JP | 9-237455 | 9/1997 |
| JP | 2867730 | 3/1999 |
| JP | 3021291 | 3/2000 |
| JP | 2004-134003 | 4/2004 |

* cited by examiner

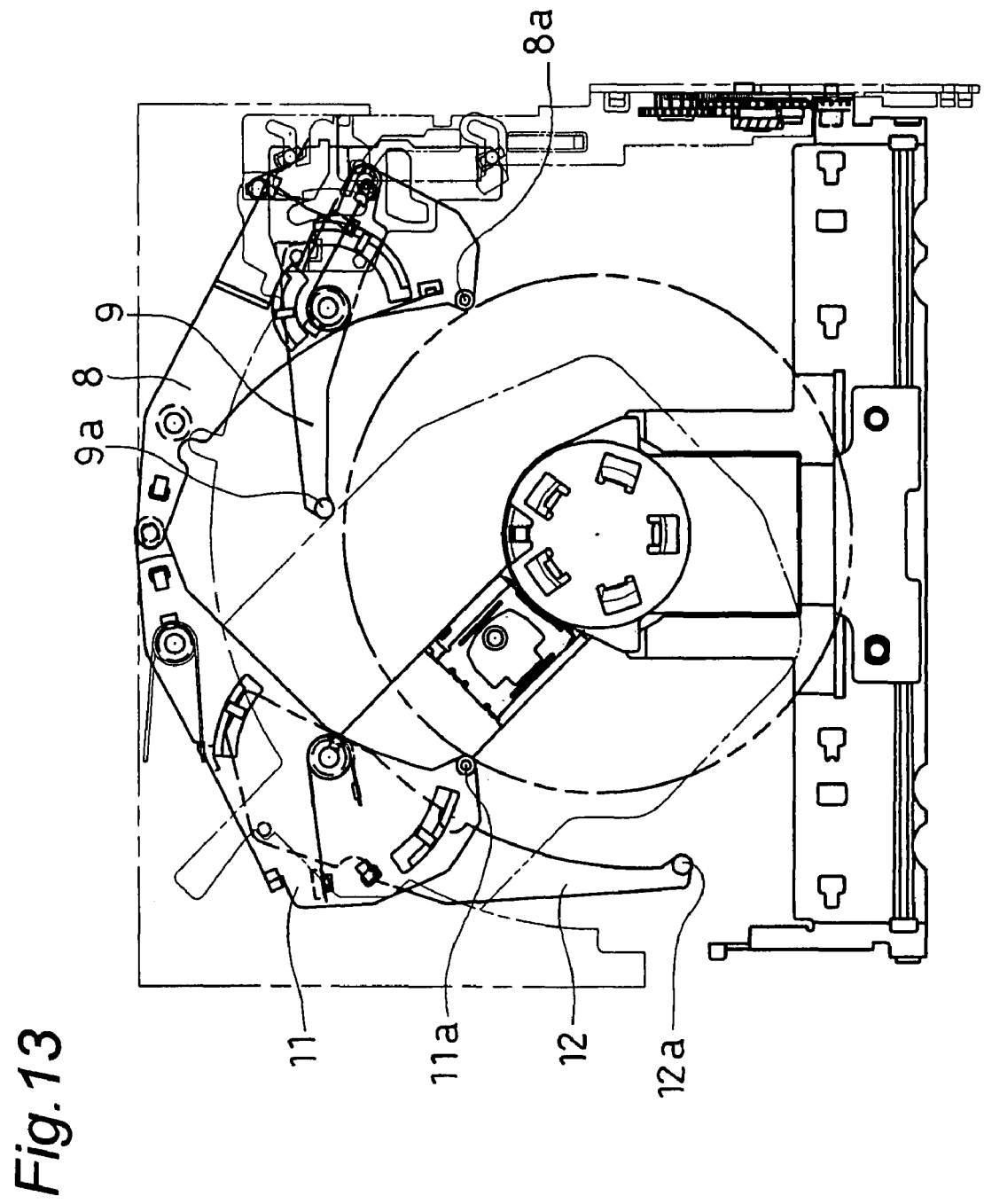

DISK LOADING DEVICE HAVING POSITIONING AND DETECTION LEVERS THAT MOVE ENTIRELY OUTSIDE AN OUTERMOST CIRCUMFERENCE OF AN AREA OCCUPIED BY A DISK MOUNTED THEREIN

BACKGROUND OF THE INVENTION

The present invention relates to a disk loading device (disk drive device) for inserting a disk-shaped recording medium into the device and mounting the recording medium in a disk mounted position.

A disk loading device is used in many fields as a device for inserting a disk such as a CD that is an optical disk for sound, a DVD that is an optical disk for image, and various optical disks for computers into the device and mounting the disk in a disk mounted position for optically recording and reproducing data on the disk. As an optical disk not housed in a case and used alone out of the above-described optical disks, two kinds of disks, i.e., a disk (large-diameter disk) of standardized diameter of 12 cm and a disk (small-diameter disk) of standardized diameter of 8 cm are used widely. Therefore, as the disk loading device, a dual-purpose disk loading device for driving both the large-diameter disk and the small-diameter disk is in the actual use.

As the dual-purpose disk loading device, a disk loading device through which an upper face of the mounted disk, e.g., a label face (face on which a nameplate of the disk is formed and which is not a data recording face) can be seen from outside the device is desired. Because the upper face can be seen, it is possible to easily and quickly identify the mounted disk and such a device is extremely convenient to use. Moreover, because an apparatus in which the disk loading device is to be mounted, e.g., a personal computer, a car stereo, and a small-sized home audiovisual system is further miniaturized and slimmed down, a disk loading device that is as thin as possible is desired.

A first prior-art dual-purpose disk loading device is disclosed in Patent Document 1 (Japanese Patent No. 3021291). In the first prior art, a plurality of levers for distinguishing between a large-diameter disk and a small-diameter disk, a plate-shaped member called "slider" for supporting these levers, and the like are provided above an upper face of a mounted disk. Therefore, it is impossible to see a label face.

In a second prior-art dual-purpose disk loading device disclosed in Patent Document 2 (Japanese Patent No. 2867730), a plurality of parts such as a disk guide plate for introducing a disk are provided above an upper face of the disk. Therefore, it is impossible to see the upper face of the disk from outside the disk loading device.

In a third prior-art disk loading device disclosed in Patent Document 3 (Japanese Unexamined Patent Publication No. 8-212655), various levers for positioning are provided above an upper face of an outer peripheral portion of a mounted disk. Therefore, only a central portion of the upper face can be seen.

As other pieces of prior art, there are techniques disclosed in Patent Document 4 (Japanese Unexamined Patent Publication No. 7-50057) and Patent Document 5 (Japanese Unexamined Patent Publication No. 9-237455).

SUMMARY OF THE INVENTION

In each of the above-described first to third prior-art disk loading devices, mechanism parts such as levers for distinguishing between the large-diameter disk and the small-diameter disk and for positioning the disks in the disk mounted position are provided above the upper face of the mounted disk. Therefore, it is impossible to see the upper face of the mounted disk from outside the disk loading device. Moreover, a mechanism parts are provided above the upper face of the disk and therefore it is difficult to reduce a thickness (a dimension in a direction perpendicular to a face of the mounted disk) of the disk loading device.

It is an object of the present invention to provide a thin disk loading device having no mechanism part above an upper face of a mounted disk.

According to the present invention, there is provided a disk loading device including a first board parallel to a mounted large-diameter or small-diameter disk and having an opening at a portion facing an upper face of each of the disks and a second board combined with the first board to form a housing. The disk loading device includes: a first positioning lever which is movably mounted to one of the first and second boards outside an area where the mounted large-diameter disk exists (large-diameter disk-mounted-area) and has a part protruding on one side inside the large-diameter disk-mounted-area when each of the disks is not mounted; a first detecting lever which is movably mounted to the first positioning lever and has a part protruding on the one side inside the large-diameter disk-mounted-area; a second positioning lever which is movably mounted to one of the first and second boards outside the large-diameter disk-mounted-area and has a part protruding on the other side inside the large-diameter disk-mounted-area when each of the disks is not mounted; and a second detecting lever which is movably mounted to the second positioning lever and has a part protruding on the other side inside the large-diameter disk-mounted-area.

The small-diameter disk is positioned in a disk mounted position by the first and second positioning levers in a case of mounting the small-diameter disk and the first and second positioning levers are pushed by the large-diameter disk to move outside the large-diameter disk-mounted-area when both of the first and second detecting levers detect the large-diameter disk in a case of mounting the large-diameter disk.

According to this invention, components of a disk positioning mechanism including the first and second detecting levers and the first and second positioning levers for positioning the large-diameter disk and the small-diameter disk in the disk mounted position are mounted outside the large-diameter disk-mounted-area. Therefore, the components of the disk positioning mechanism do not exist above the upper face of the disk in a state in which mounting of the disk has been completed. Therefore, it is possible to slim down the whole device and it is possible to see the upper face of the disk.

According to another aspect of the present invention, there is provided a disk loading device including a first board parallel to a mounted large-diameter or small-diameter disk and a second board combined with the first board to form a housing. The disk loading device includes: a third positioning lever and a fourth positioning lever which are linked to each other, which have turning shafts on one of the first and second boards outside a large-diameter disk-mounted-area, and parts of which respectively protrude inside the large-diameter disk-mounted-area when each of the disks is not mounted, the large-diameter disk-mounted-area being an area where the mounted large-diameter disk exists; a third detecting lever provided to both or at least one of the third positioning lever and the fourth positioning lever to be able to turn and having a first engaging portion a part of which is engaged with the first restricting portion when each of the disks is not mounted; and the fourth detecting lever provided to the third positioning lever or the fourth positioning lever provided with the third detecting lever to be able to turn and having a second engaging portion a part protruding inside the large-diameter disk-mounted-area to be engaged with a second restricting portion provided to the first board or the second board when each of the disks is not mounted.

The small-diameter disk is positioned in a disk mounted position by the third and fourth positioning levers in a case of mounting the small-diameter disk and the third and fourth positioning levers are pushed by the large-diameter disk to move outside the first disk-mounted-area when both of the third and fourth detecting levers detect the large-diameter disk in a case of mounting the large-diameter disk.

According to this invention, components of a disk positioning mechanism including the third and fourth detecting levers and the third and fourth positioning levers for positioning the large-diameter disk and the small-diameter disk in the disk mounted position are mounted outside the large-diameter disk-mounted-area. Therefore, the components of the disk positioning mechanism do not exist above the upper face of the disk in a state in which mounting of the disk has been completed. Therefore, it is possible to slim down the disk loading device.

According to this invention, the detecting lever, the trigger lever, and the left and right centering levers for positioning the large-diameter disk and the small-diameter disk are mounted outside the large-diameter disk-mounted-area. Therefore, the respective levers do not exist above the upper face of the disk when the large-diameter or small-diameter disk is mounted in the disk mounted position. As a result, it is possible to see the upper face of the mounted large-diameter or small-diameter disk from outside the disk loading device. Thus, it is possible to visually check presence or absence of the disk, the upper face of the disk (e.g., the label face), and a rotating state of the disk. Because the respective levers do not exist above the upper face of the disk, it is possible to slim down the disk loading device.

BRIEF DESCRIPTION OF THE DRAWINGS

These and other aspects and features of the present invention will become clear from the following description taken in conjunction with the preferred embodiments thereof with reference to the accompanying drawings, in which:

FIG. 13 is a partial top view showing a state after completion of mounting of the small-diameter disk in the disk loading device of the first embodiment of the present invention;

DETAILED DESCRIPTION OF THE INVENTION

Figure 1:
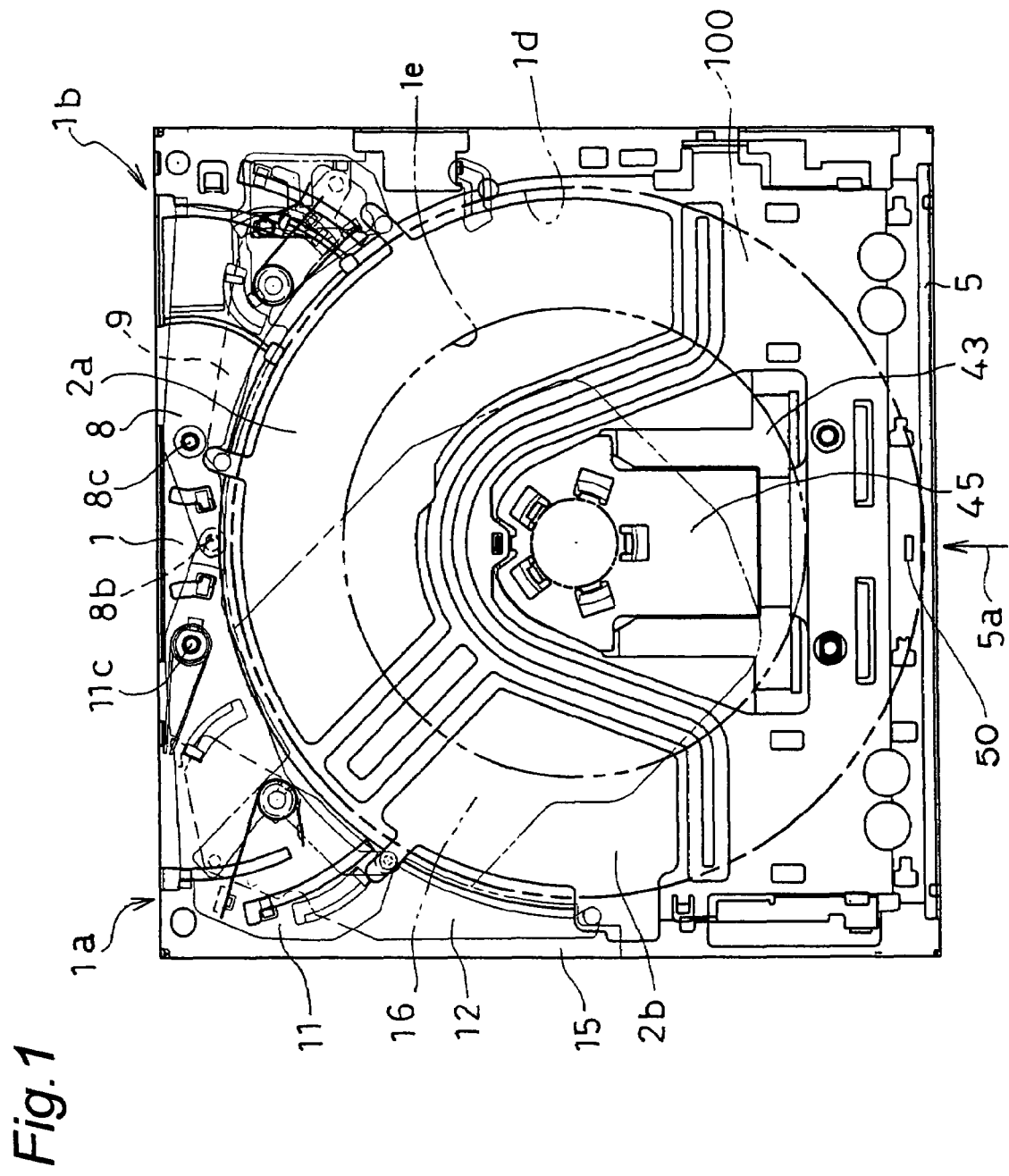
FIG. 1 is a top view of a disk loading device of the first embodiment of the present invention.

Before the description of the present invention proceeds, it is to be noted that like components are designated by like reference numerals throughout the accompanying drawings.

In the present invention, the disk loading device refers to a device for inserting a disk-shaped recording medium into the device and mounting the disk in a disk mounted position for carrying out recording on and playback of the medium. As the recording medium, there are a CD that is an optical disk for sound, a DVD that is an optical disk for image, and various optical disks for computers.

In the present invention, "insertion" refers to a moving operation of the disk from insertion of the disk into the insertion slot of the disk loading device to positioning of the disk in the disk mounted position.

The disk loading devices of the best embodiments of the present invention will be described below in detail based on the drawings.

First Embodiment

A disk loading device of a first embodiment of the present invention will be described with reference to FIGS. 1 to 18.

Figure 2:
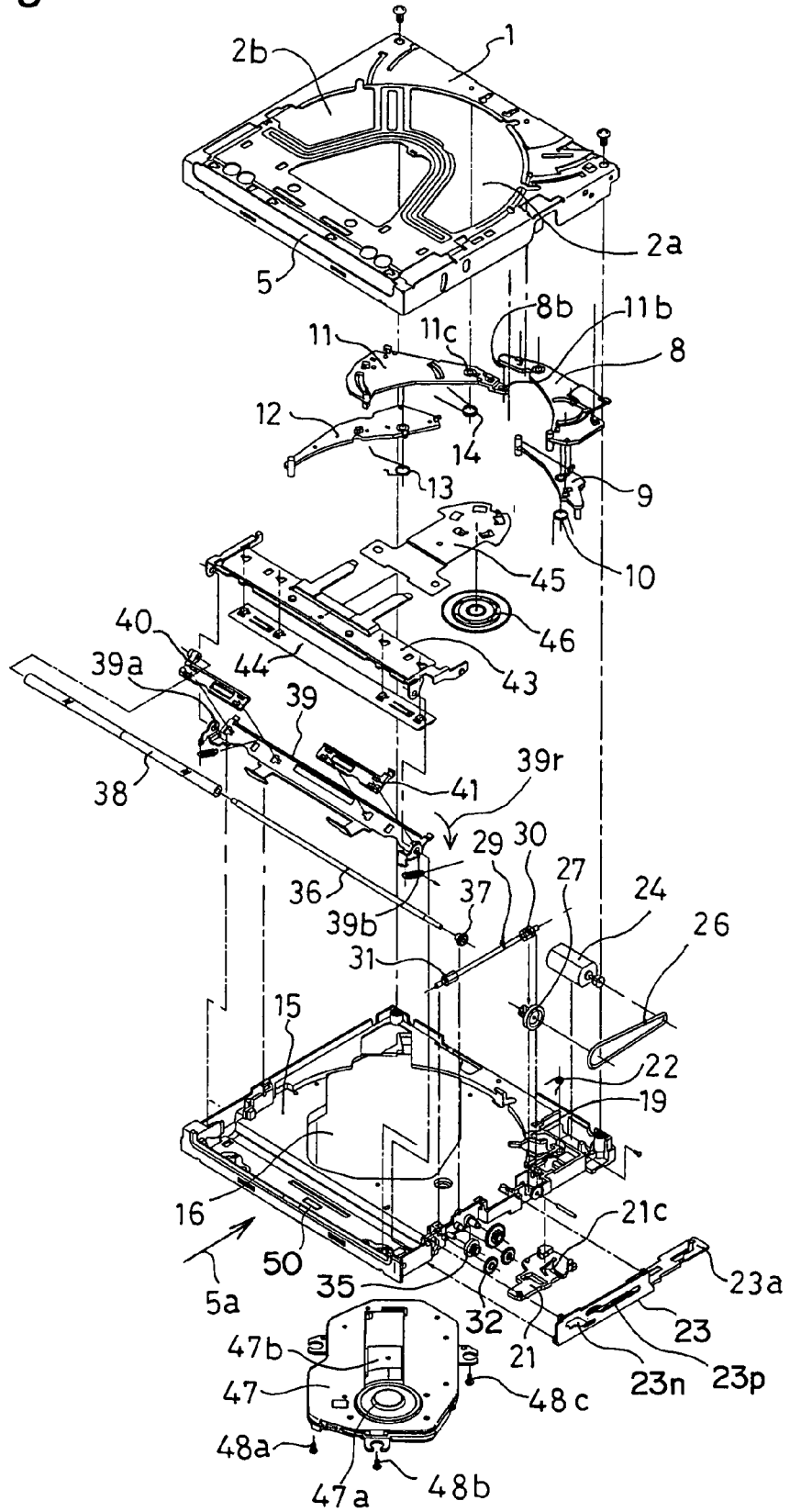
FIG. 2 is an exploded perspective view of the disk loading device of the first embodiment of the present invention.
Figure 15A:
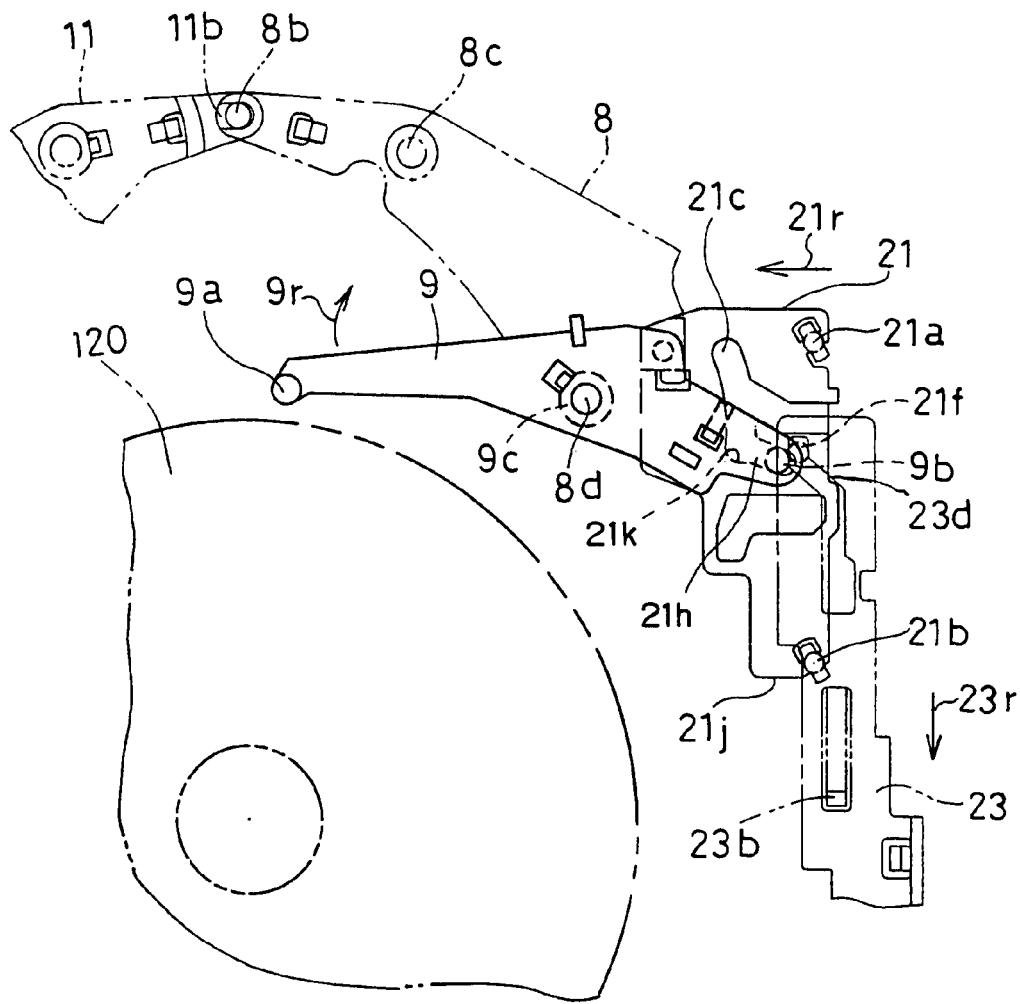
FIG. 15A is a partial top view showing a state of the trigger lever at the time of completion of mounting of the small-diameter disk in the disk loading device of the first embodiment of the present invention.
Figure 15B:
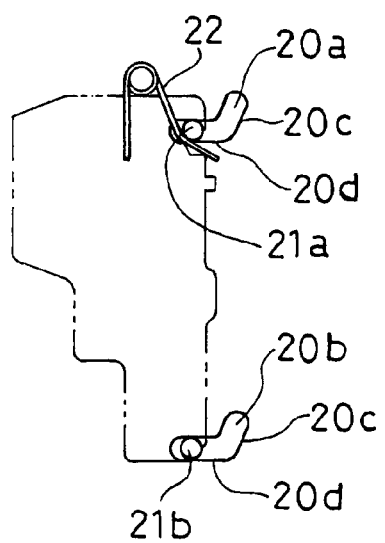
FIG. 15B is an explanatory view of movement of the trigger rod in FIG. 15A.
Figure 16:
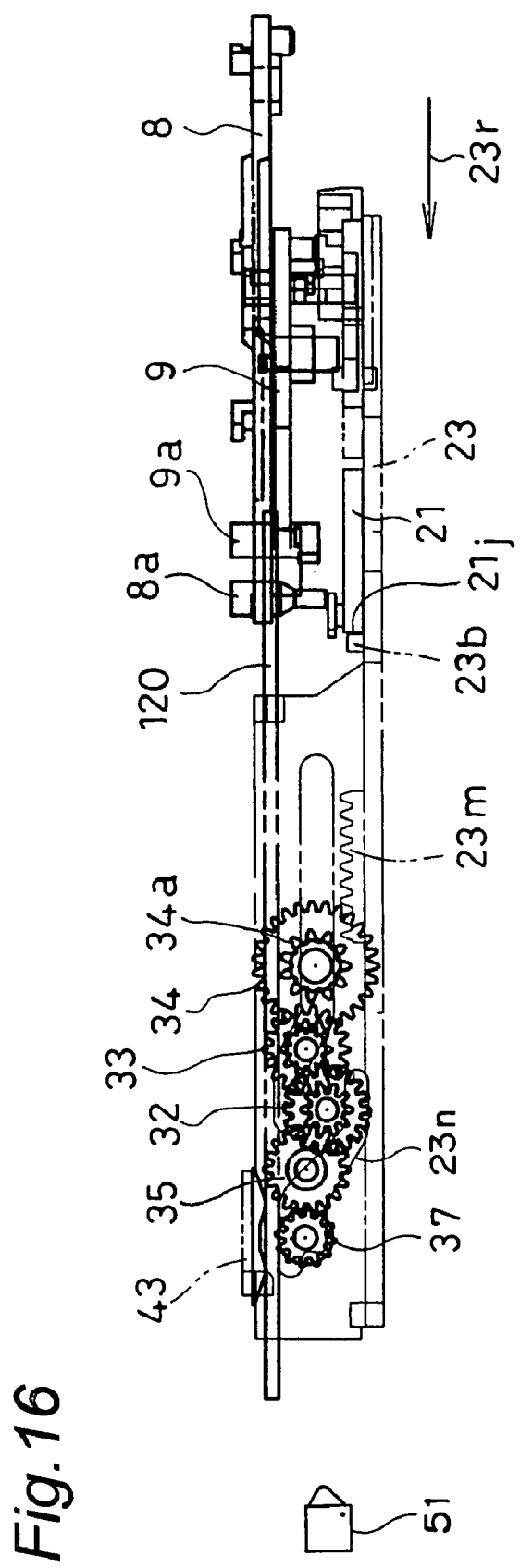
FIG. 16 is a right side view of FIG. 11 during insertion of the small-diameter disk in the disk loading device of the first embodiment of the present invention.
Figure 17:
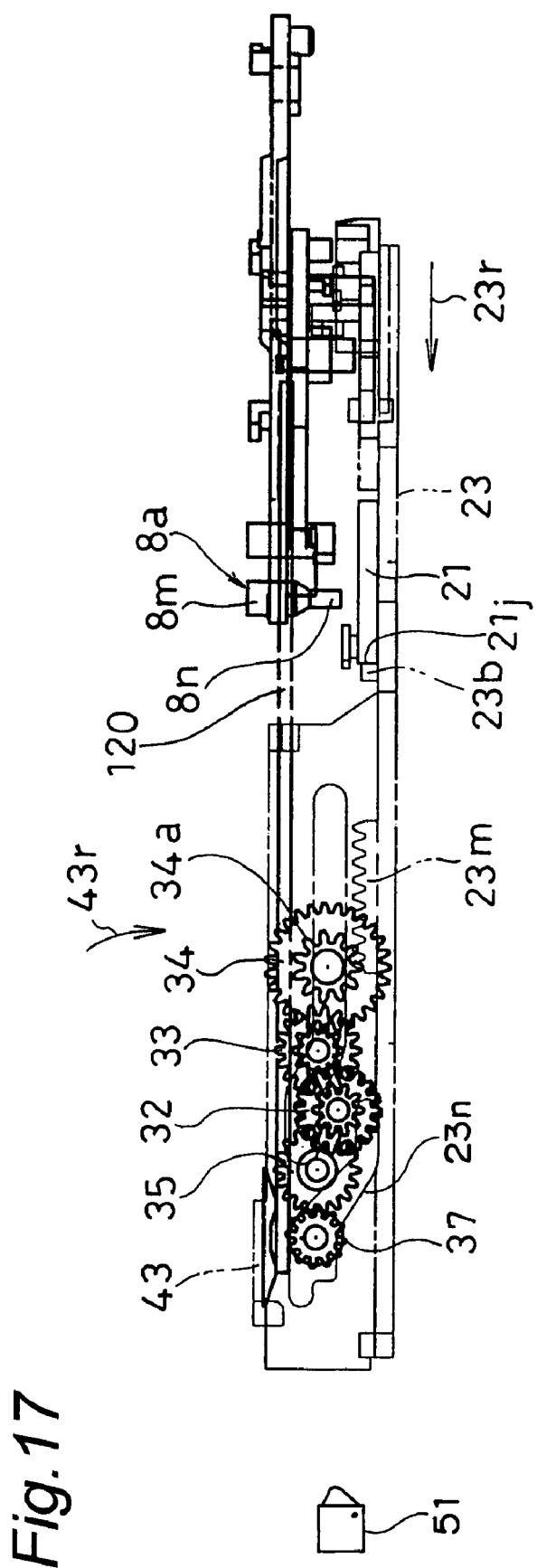
FIG. 17 is a right side view of FIG. 12 during insertion of the small-diameter disk in the disk loading device of the first embodiment of the present invention.
Figure 18:
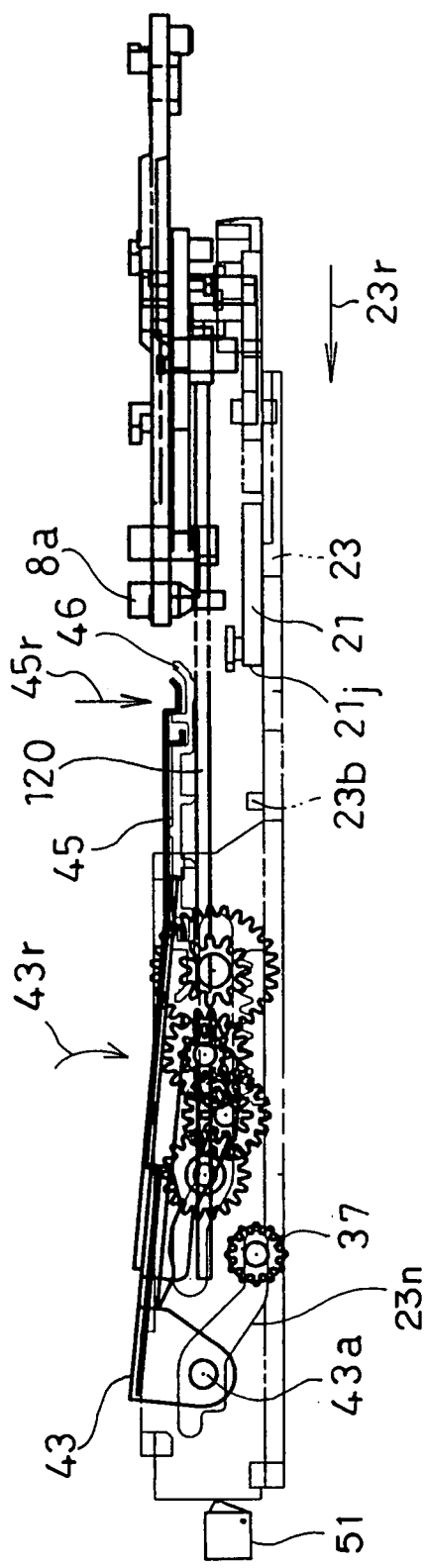
FIG. 18 is a right side view of FIG. 13 after completion of mounting of the small-diameter disk in the disk loading device of the first embodiment of the present invention.

FIG. 1 is a top view of the disk loading device of the first embodiment of the present invention and FIG. 2 is an exploded perspective view of the same. FIGS. 3 to 6 are top views showing operation when a disk of standardized diameter of 12 cm (hereafter referred to as a large-diameter disk 100) is mounted in the disk loading device. FIGS. 7A to 9A are partial top views showing movement of a trigger lever when the large-diameter disk 100 is mounted. FIGS. 10 to 13 are top views of the disk loading device and showing operation when a disk of standardized diameter of 8 cm (hereafter referred to as a small-diameter disk 120) is mounted. FIGS. 14A to 15A are partial top views showing operation of the trigger lever 9 when the small-diameter disk 120 is mounted. FIGS. 16 to 18 are right side views of FIG. 13.

In FIGS. 1 and 2, the disk loading device of the first embodiment of the present invention is formed by mounting respective parts shown in FIG. 2 into a housing formed of a lowermost support board 15 and an uppermost sub chassis 1. In other words, the support board 15 supports the respective parts shown in FIG. 2. The support board 15 has a traverse mounting hole 16 at its central portion. Into the traverse mounting hole 16, a traverse 47 having a turntable 47a and an optical pickup 47b is mounted by three mounting screws 48a, 48b, and 48c.

The sub chassis 1 is formed with sector-shaped opening portions 2a, 2b and, an upper face (e.g., a label face) of each disk can be seen from the opening portions 2a, 2b when the large-diameter disk 100 or the small-diameter disk 120 is mounted in the disk loading device as will be described later. An area occupied by the large-diameter disk 100 mounted in the disk loading device is referred to as a "large-diameter disk-mounted-area 1d", an area occupied by the small-diameter disk 120 is referred to as a "small-diameter disk-mounted-area 1e", and these areas are shown in two-dot chain lines in FIG. 1.

In a vicinity of a disk insertion slot 5 of the disk loading device, a rubber roller 38 retained by a roller shaft 36 is provided. The roller shaft 36 is rotatably supported by a left bearing 40 and a right bearing 41 mounted to opposite end portions of a roller lever 39. A roller gear 37 is mounted to a right end of the roller shaft 36 in FIG. 2. The roller gear 37 is coupled to a motor 24 through a relay gear A35, a worm wheel A32, a worm gear 31, a turning shaft 29, a worm wheel B30, worm pulley 27, and a belt 26. Normally, if the motor 24 rotates, the roller shaft 36 and the rubber roller 38 fitted over the roller shaft 36 rotate.

The roller lever 39 is rotatably mounted to the support board 15 through bearing holes 39a, 39b at its opposite end portions. A clamp lever 43 having the same central axis of rotation as the bearing holes 39a, 39b is also mounted for turning. The clamp lever 43 is mounted with a guide rod 44 in such a position as to face the rubber roller 38 and is mounted with a retaining leaf spring 45 on a side of a clamper 46. The clamper 46 for retaining the disk 100 for rotation is rotatably mounted to the retaining leaf spring 45.

In FIG. 2, the trigger lever 9 and a disk detecting lever 12 shown below the sub chassis 1 in FIG. 2 as an example of a second detecting lever and an example of a first detecting lever, respectively, are a group of levers for coming in contact with an outer periphery of the disk 100 or 120 inserted in a direction of an arrow 5a from the insertion slot 5 to thereby detect insertion of the disk 100 or 120 into the disk loading device. Moreover, a right centering lever 8 that is an example of a second positioning lever and a left centering lever 11 that is an example of a first positioning lever are a group of levers for coming in contact with the outer periphery of disk 120 inserted in the direction of the arrow 5a from the insertion slot 5 to position the disk 20 in a disk mounted position.

In the disk loading device of the first embodiment, as will be specifically described later, these groups of levers are mounted in an upper left corner portion 1a and an upper right corner portion 1b and outside the large-diameter disk-mounted-area 1d of the sub chassis 1 that is an example of a first board shown in FIG. 1. The present embodiment is characterized in that, when the disk 100 is mounted, all levers in the groups are in an area outside the outer periphery of the disk 100, i.e., outside the large-diameter disk-mounted-area 1d and do not exist in the large-diameter disk-mounted-area 1d. These groups of levers may be mounted to the support board 15 that is an example of a second board.

Figure 3:
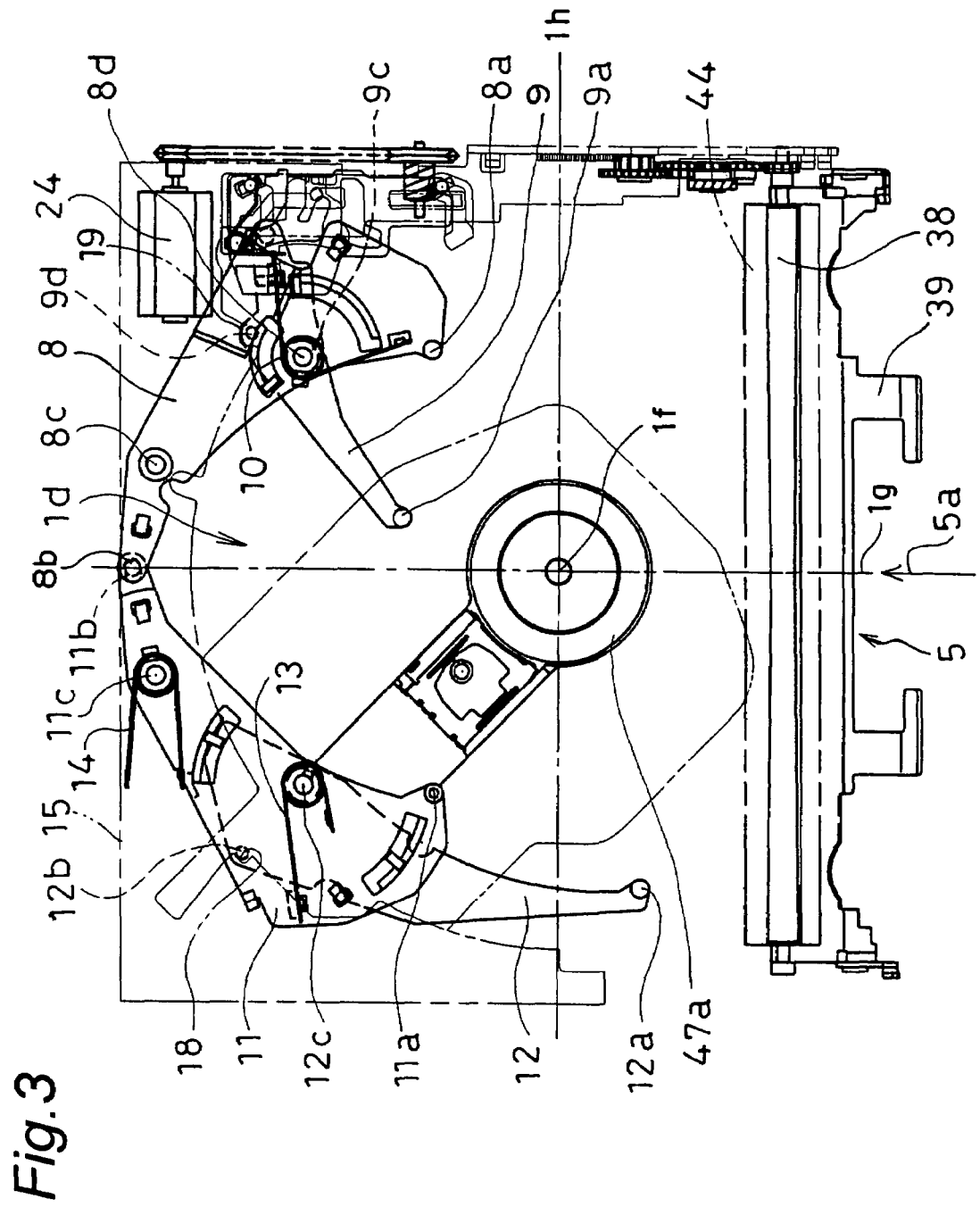
FIG. 3 is a partial top view showing a state of the disk loading device of the first embodiment of the present invention before insertion of a disk.

In FIG. 3, the right centering lever 8 is mounted to the sub chassis 1 so as to be able to turn on a fulcrum 8c. The trigger lever 9 is mounted to a shaft 8d provided to the right centering lever 8 so as to be able to turn on a fulcrum 9c. The left centering lever 11 is mounted to the sub chassis 1 so as to be able to turn on a fulcrum 11c. The detecting lever 12 is mounted to the left centering lever 11 so as to be able to turn on a fulcrum 12c. Here, the centering levers 8, 11 are coupled respectively as will be described later to have functions as first and second positioning levers for carrying out positioning of the disk 120 at the time of insertion.

With reference to FIGS. 2 to 9B, operation when the large-diameter disk 100 of the standardized diameter of 12 cm is mounted into the disk loading device of the first embodiment will be described. FIGS. 3 to 6 are top views of the disk loading device and showing only components related to the mounting operation of the disk 100.

FIG. 3 shows a state before insertion of the disk 100. The trigger lever 9 is in a state in which a cam pin 9d provided in a vicinity of the fulcrum 9c of the trigger lever 9 faces a right stopper 19 that is a recessed portion formed in the support board 15 and a disk engaging pin 9a that is an example of an engaging pin provided to a tip end thereof reaches a vicinity of a central portion of the large-diameter disk-mounted-area 1d (inside the small-diameter disk-mounted-area 1e (FIG. 1)). The disk detecting lever 12 is in a state in which a cam pin 12b provided in a vicinity of the fulcrum 12c of the disk detecting lever 12 faces a left stopper 18 formed in the support board 15 and a disk detecting pin 12a that is an example of a detecting pin provided to a tip end thereof is positioned immediately inside a left rim of the large-diameter disk-mounted-area 1d. A portion of the left centering lever 11 including a disk positioning pin 11a that is an example of a positioning pin is positioned immediately inside the left rim of the large-diameter disk-mounted-area 1d. A portion of the right centering lever 8 including a disk positioning pin 8a is positioned immediately inside a right rim of the large-diameter disk-mounted-area 1d. The disk positioning pin 8a of the right centering lever 8 and the disk positioning pin 11a of the left centering lever 11 are disposed to be line-symmetric with respect to a line 1g passing through a center 1f of the large-diameter disk-mounted-area 1d in a disk inserting direction 5a and are disposed downstream in the disk inserting direction from a line 1h passing through the center 1f and orthogonal to the line 1g as shown in FIG. 3. Positions of the trigger lever 9 and the disk detecting lever 12 before insertion of the disk and shown in FIG. 3 are referred to as "initial positions".

The trigger lever 9 is biased counterclockwise by a biasing spring 10 about the fulcrum 9c and the disk detecting lever 12 is biased counterclockwise by a disk detecting lever spring 13 about the fulcrum 12c. The left centering lever 11 is biased counterclockwise by a centering lever spring 14 about the fulcrum 11c. With these springs 10, 13, and 14, the disk detecting pin 12a and the disk positioning pin 11a are stably retained inside the large-diameter disk-mounted-area 1d and the disk engaging pin 9a is stably retained inside the small-diameter disk-mounted-area 1e. The right centering lever 8 is coupled to an engaging hole 11b in the left centering lever 11 by an engaging pin 8b provided to an end portion on a side opposite to the disk positioning pin 8a. Therefore, the right centering lever 8 is biased clockwise about the fulcrum 8c by the centering lever spring 14 biasing the left centering lever 11 counterclockwise. With this biasing, the disk positioning pin 8a is stably retained inside the large-diameter disk-mounted-area 1d.

If the disk 100 is inserted in the direction of the arrow 5a from the insertion slot 5 shown in FIGS. 2 and 3, a switch 50 provided in a vicinity of a center of the insertion slot 5 is actuated into a closed state before the disk 100 comes in contact with the rubber roller 38. The switch 50 is formed of an optical sensor, for example. When the switch 50 is closed, the motor 24 is energized and rotated and the rubber roller 38 is rotated by rotation of the motor 24. Moreover, when the disk 100 is inserted into the disk loading device, the disk 100 is sandwiched between the rotating rubber roller 38 and the guide rod 44 fixed to the clamp lever 43 and is driven in the direction of the arrow 5a in FIG. 3.

The disk 100 moved by driving of the rubber roller 38 further moves in the direction of the arrow 5a after an outer periphery of the disk 100 comes in contact with the disk engaging pin 9a of the trigger lever 9 and the disk detecting pin 12a of the disk detecting lever 12. The state in which the outer periphery of the disk 100 has just come in contact with the disk positioning pins 8a and 11a is shown in FIG. 4.

Figure 4:
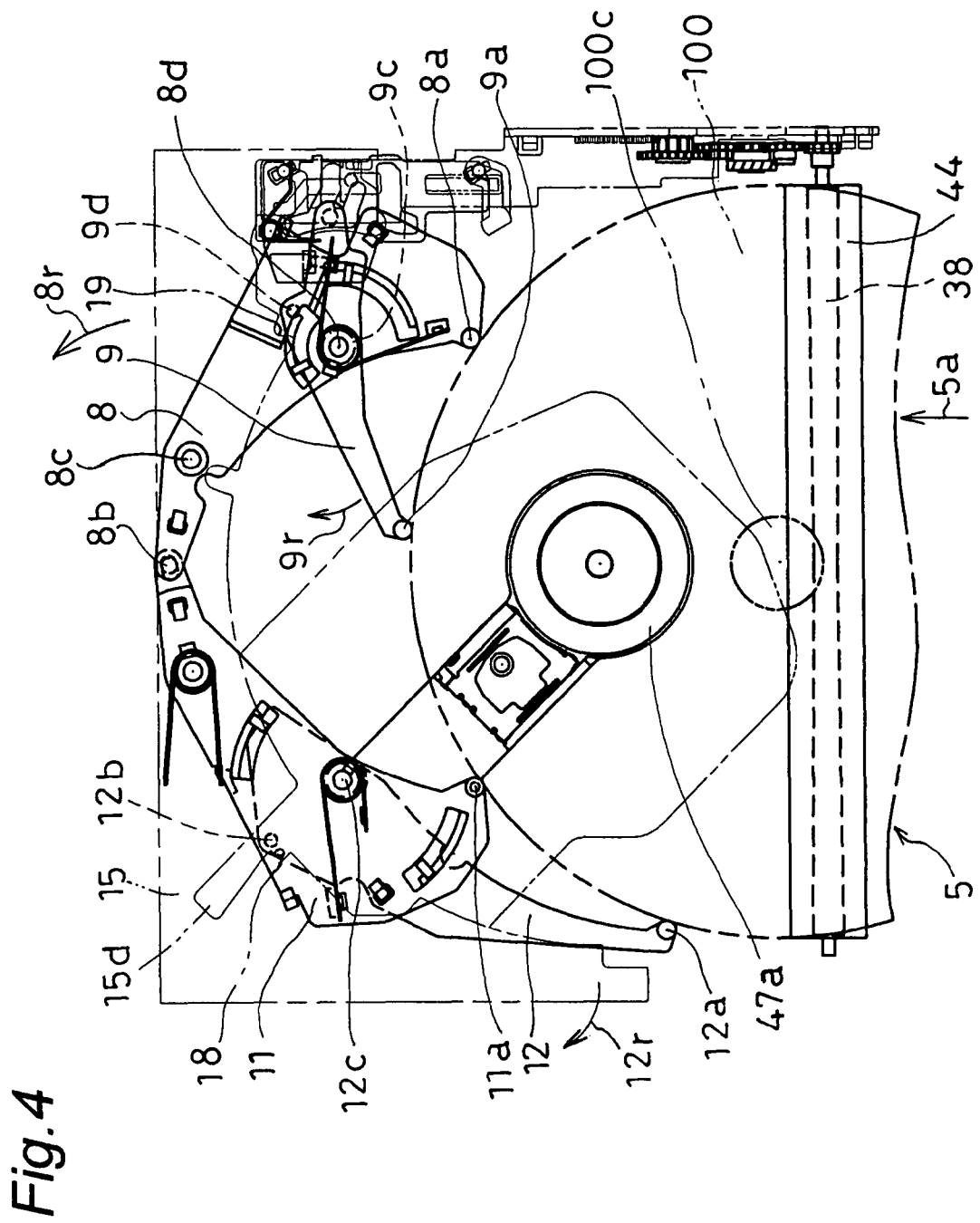
FIG. 4 is a partial top view showing a state during insertion of a large-diameter disk in the disk loading device of the first embodiment of the present invention.

In a process of the change from the state in FIG. 3 to the state in FIG. 4, the disk detecting pin 12a of the disk detecting lever 12 pushed by the disk 100 turns in a direction (clockwise) shown by an arrow 12r about the fulcrum 12c. Due to turning of the disk detecting lever 12 in the direction of the arrow 12r, the cam pin 12b near the fulcrum 12c of the disk detecting lever 12 also turns similarly in the direction of the arrow 12r and becomes detached from the left stopper 18. As a result, a locked state of the left centering lever 11 is cancelled. FIG. 4 shows the detached state. The disk detecting lever 12 comes into a state in which its cam pin 12b faces a groove cam 15d of the support board 15 and therefore becomes able to further turn in the direction of the arrow 12r. In other words, the disk detecting lever 12 can further turn together with the left centering lever 11.

Furthermore, in the process of shifting from the state in FIG. 3 to the state in FIG. 4, the disk engaging pin 9a of the trigger lever 9 is pushed by the outer periphery of the disk 100 and the trigger lever 9 turns about the fulcrum 9c in the direction shown by an arrow 9r (clockwise) and the cam pin 9d becomes detached from the right stopper 19. As a result, the locked state of the right centering lever 8 is cancelled. In this way, the trigger lever 9 becomes able to further turn together with the right centering lever 8.

Figure 5:
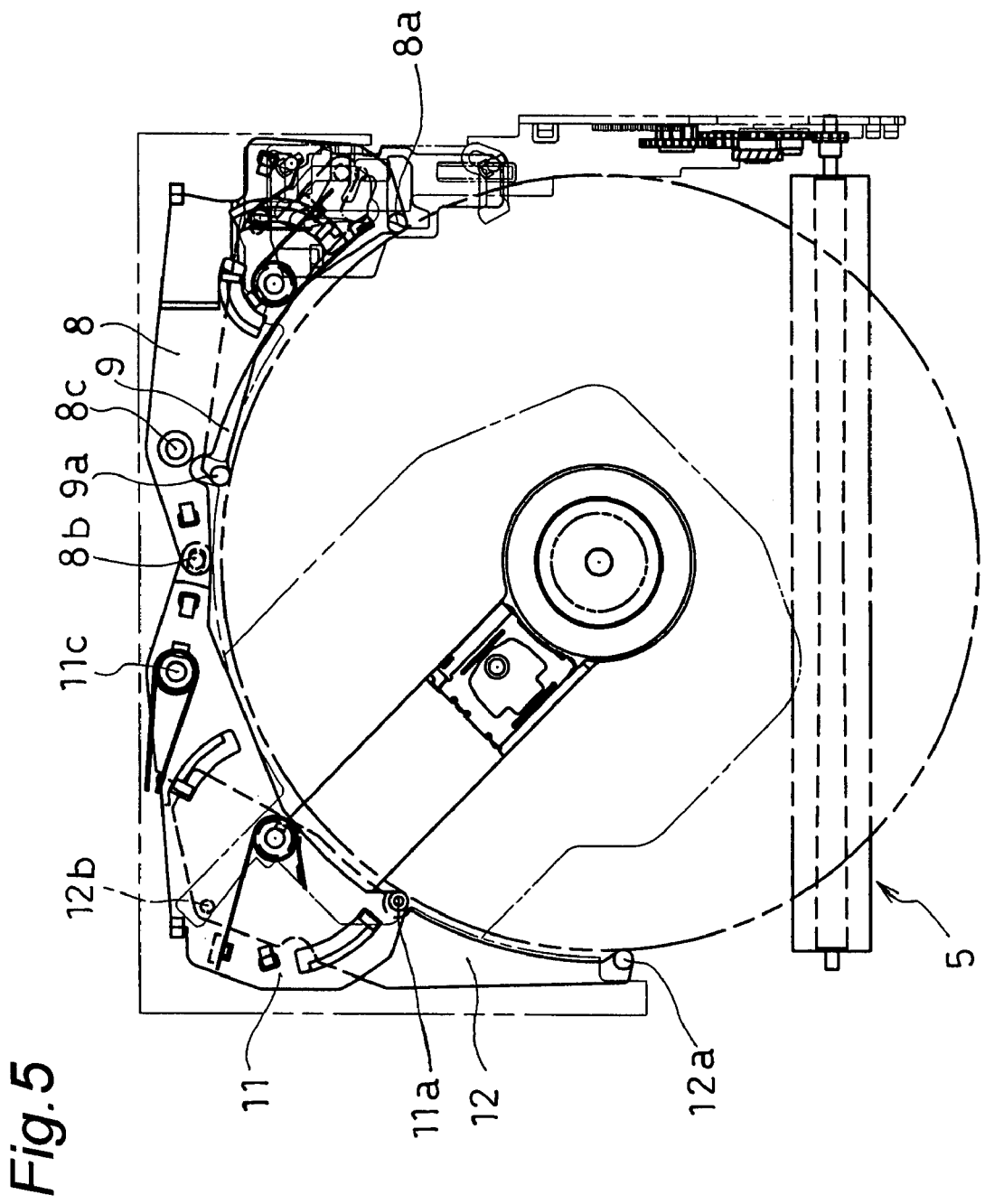
FIG. 5 is a partial top view showing a state in which movement has stopped during insertion of the large-diameter disk in the disk loading device of the first embodiment of the present invention.

When the disk 100 further moves in the direction of the arrow 5a, the disk positioning pins 8a, 11a, the disk engaging pin 9a, and the disk detecting pin 12a are respectively pushed in the direction of the outer periphery of the disk 100 to go outside the large-diameter disk-mounted-area 1d and come into a state shown in FIG. 5. In this state, the disk 100 comes in contact with a wall 15a of the support board 15 to stop its movement and is positioned in the disk mounted position. At this time, the roller shaft 36 is being rotated by the motor 24 and the rotation of the roller shaft 36 is transmitted to the rubber roller 38 by constant frictional force. Because frictional force between the disk 100 and the rubber roller 38 increases, the rubber roller 38 in contact with the recording face of the disk 100 does not rotate and roller shaft 36 and the rubber roller 38 rotate while sliding on each other.

Figure 6:
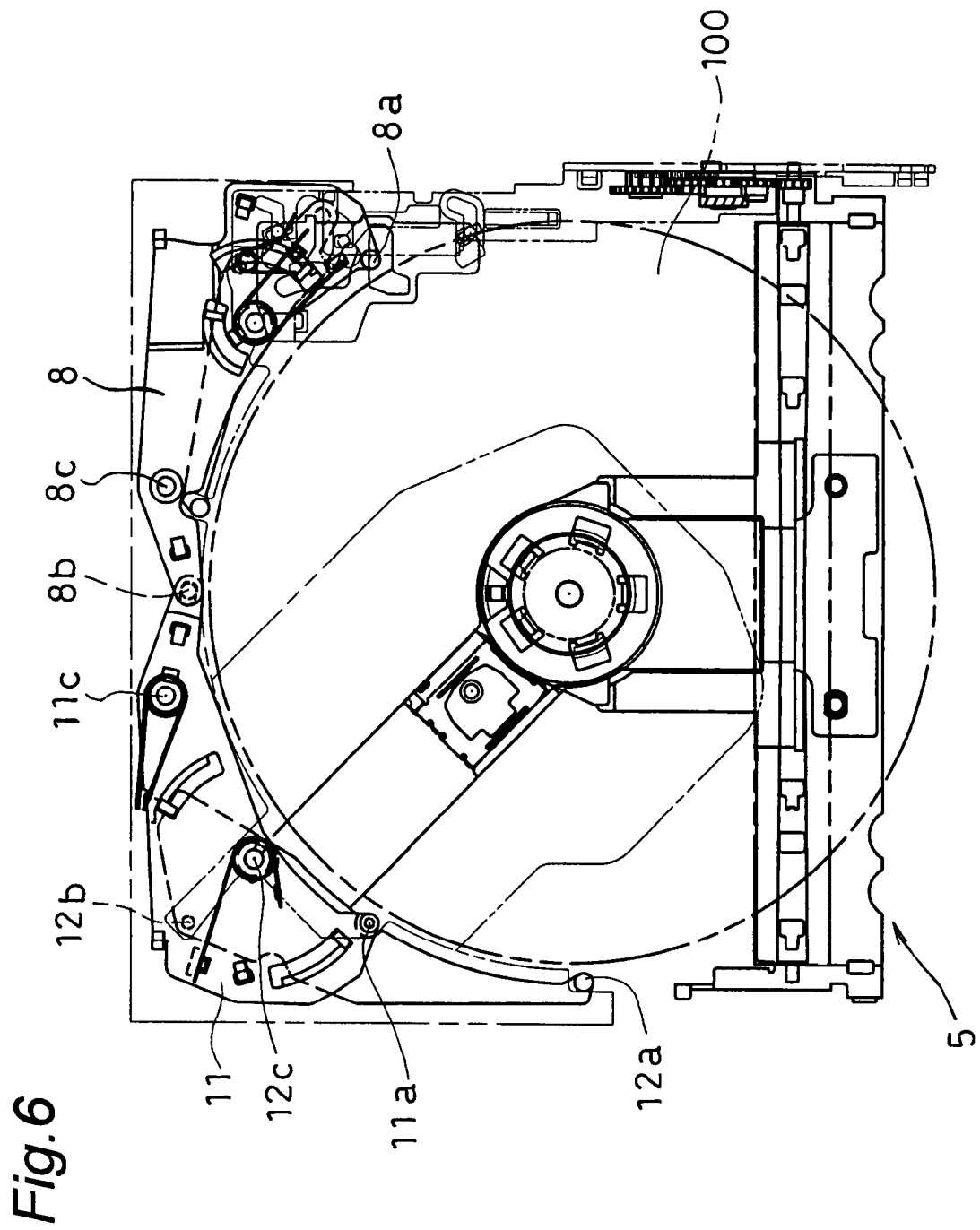
FIG. 6 is a partial top view showing a state in which mounting of the large-diameter disk has been completed in the disk loading device of the first embodiment of the present invention.

As will be described later in detail, by moving the clamper 46 shown in FIG. 2 toward the turntable 47a of the traverse 47 and causing the rubber roller 38 to retreat downward, the turntable 47a enters the central hole of the disk 100 to mount the disk 100. Then, the disk positioning pins 8a, 11a, the disk engaging pin 9a, and the disk detecting pin 12a are separated from the outer periphery of the disk 100 due to operation which will be described later and the separated state is shown in FIG. 6. In this state, a switch 51 which will be described later is actuated to stop the motor 24 and mounting of the disk 100 is completed.

Figure 7A:
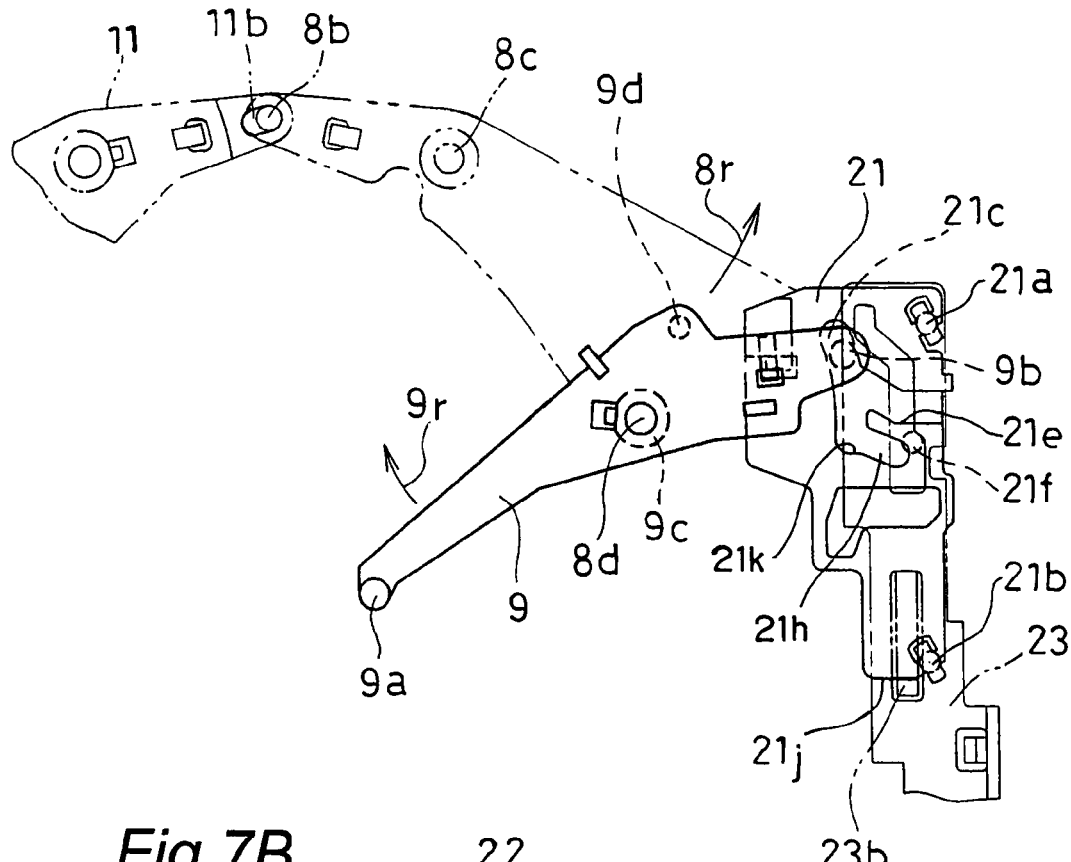
FIG. 7A is a partial top view showing a state of a trigger lever before insertion of the disk in the disk loading device of the first embodiment of the present invention.

Operation of the trigger lever 9 will be described specifically with reference to FIGS. 7A to 9B. FIG. 7A shows a position of the trigger lever 9 before insertion of the disk 100 and this position is the same as that in FIG. 3. FIGS. 7A to 9B show the trigger lever 9, a trigger rod 21, and a cam rod 23 and positional relationships between them are shown in the exploded perspective view in FIG. 2. The trigger lever 9 is biased counterclockwise about the fulcrum 9c as a center of turning by the biasing spring 10 (FIG. 3).

Figure 7B:
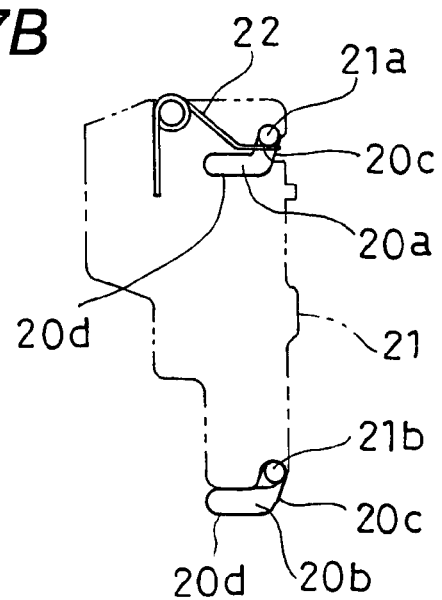
FIG. 7B is an explanatory view of movement of a trigger rod in FIG. 7A.

In the state in FIG. 7A showing the same state as that in FIG. 3, a driving pin 9b on a right end of the trigger lever 9 is in a first groove cam 21c formed on the trigger rod 21. The trigger rod 21 is biased upward in FIG. 7A by a biasing pin 22 acting on one guide pin 21a out of guide pins 21a, 21b of the trigger rod 21 fitted in guide holes 20a, 20b formed on the support board 15 (FIG. 2) as shown in FIG. 7B. Each of the guide holes 20a, 20b includes an oblique guide portion 20c inclined with respect to a moving direction (vertical direction in FIG. 7A) of the cam rod 23 and a guide portion 20d in a lateral direction in FIG. 7A. In FIG. 7B, the guide pins 21a, 21b are retained at upper ends of the oblique guide portions 20c while biased by the biasing pin 22.

If the trigger lever 9 and the right centering lever 8 are pushed by the outer periphery of the inserted disk 100 and turn in the direction of the arrow 9r from the state in FIG. 7A, the disk 100 moves to such a position as to come in contact with the disk positioning pins 8a, 11a and comes into the state shown in FIG. 4. In the state shown in FIG. 4, the cam pin 9d of the trigger lever 9 becomes detached from the right stopper 19 and the trigger lever 9 can further turn together with the right centering lever 8. Therefore, the trigger lever 9 is further pushed by the disk 100 and turns in the direction of the arrow 9r about the fulcrum 9c. Moreover, the fulcrum 9c of the trigger lever 9 fitted with the shaft 8d of the right centering lever 8 turning counterclockwise about the fulcrum 8c with its disk positioning pin 8a pushed by the disk 100 moves in the direction of the arrow 8r as the right centering lever 8 turns. As a result of the turning of the trigger lever 9 and the movement of the fulcrum 9c, the driving pin 9b of the trigger lever 9 moves from the groove cam 21c to a groove cam 21e.

Figure 8A:
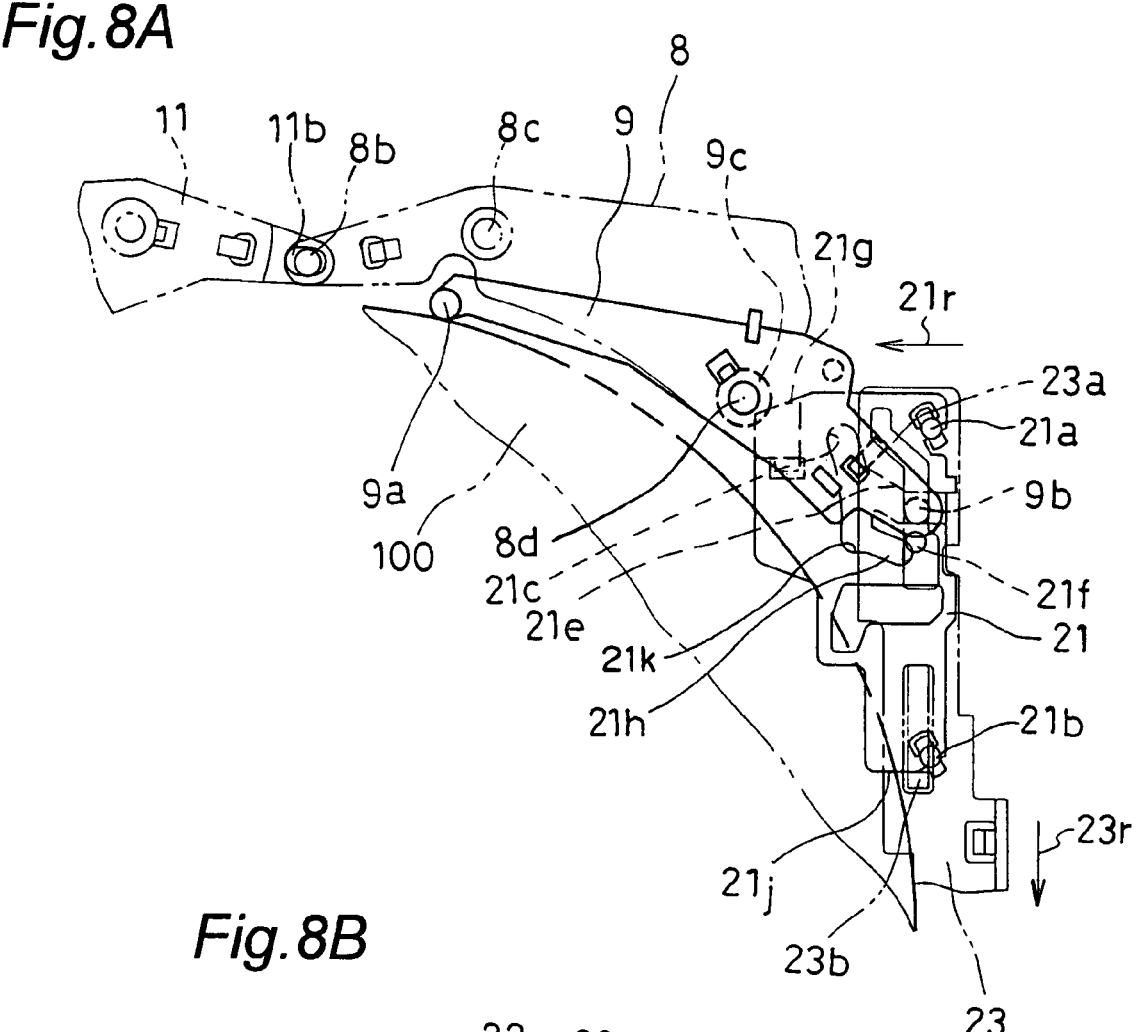
FIG. 8A is a partial top view showing a state of the trigger lever during insertion of the disk in the disk loading device of the first embodiment of the present invention.
Figure 8B:
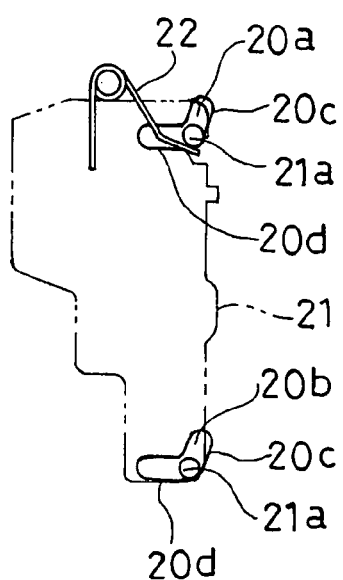
FIG. 8B is an explanatory view of movement of the trigger rod in FIG. 8A.

The state after the movement is shown in FIG. 8A. As a result of this movement, the guide pins 21a, 21b move from the upper ends to lower ends of the oblique guide portions 20c of the guide holes 20a, 20b against biasing force of the biasing pin 22 as shown in FIG. 8B and therefore the trigger rod 21 moves downward. FIG. 8A shows the same state as FIG. 5 and shows the state in which the disk 100 has reached the disk mounted position.

The downward movement of the trigger rod 21 in FIGS. 7A and 8A due to a change from the state in FIG. 7A to the state in FIG. 8A is referred to as "initial movement". Due to the initial movement, an end face 21j of the trigger rod 21 is engaged with and pushes a pin 23b of the cam rod 23. Before the initial movement of the cam rod 23, a rack 23m provided to the cam rod 23 is not engaged with a driving pinion 34a as shown in FIG. 16. As a result of the initial movement, the rack 23m moves to such a position as to be engaged with the driving pinion 34a as shown in FIG. 17. Positions of the trigger lever 9 and the disk detecting lever 12 after the initial movement of the trigger rod 21 are referred to as "trigger positions". Because a gear train 34, 34a, 33, 32, 35 is rotated by the motor 24, the cam rod 23 is driven by the motor 24 through the rack 23m and starts moving in a direction shown by an arrow 23r, i.e. a direction opposite to the disk inserting direction 5a. As a result of movement of the cam rod 23 in the direction of the arrow 23r, a driving mechanism having the motor 24, the belt 26, the worm pulley 27, the worm wheel B30, the turning shaft 29, the worm gear 31, the worm wheel A32, the relay gear 35, the roller gear 37, the roller shaft 36, the rubber roller 38, and an oblique hole portion 23n turns the clamp lever 43 shown in FIG. 2 in a direction of an arrow 43r shown in FIGS. 17 and 18 as will be described later. As a result, the clamper 46 moves down and the turntable 47a (FIG. 2) of the traverse 47 enters the central hole of the disk 100 to mount the disk 100.

Figure 9A:
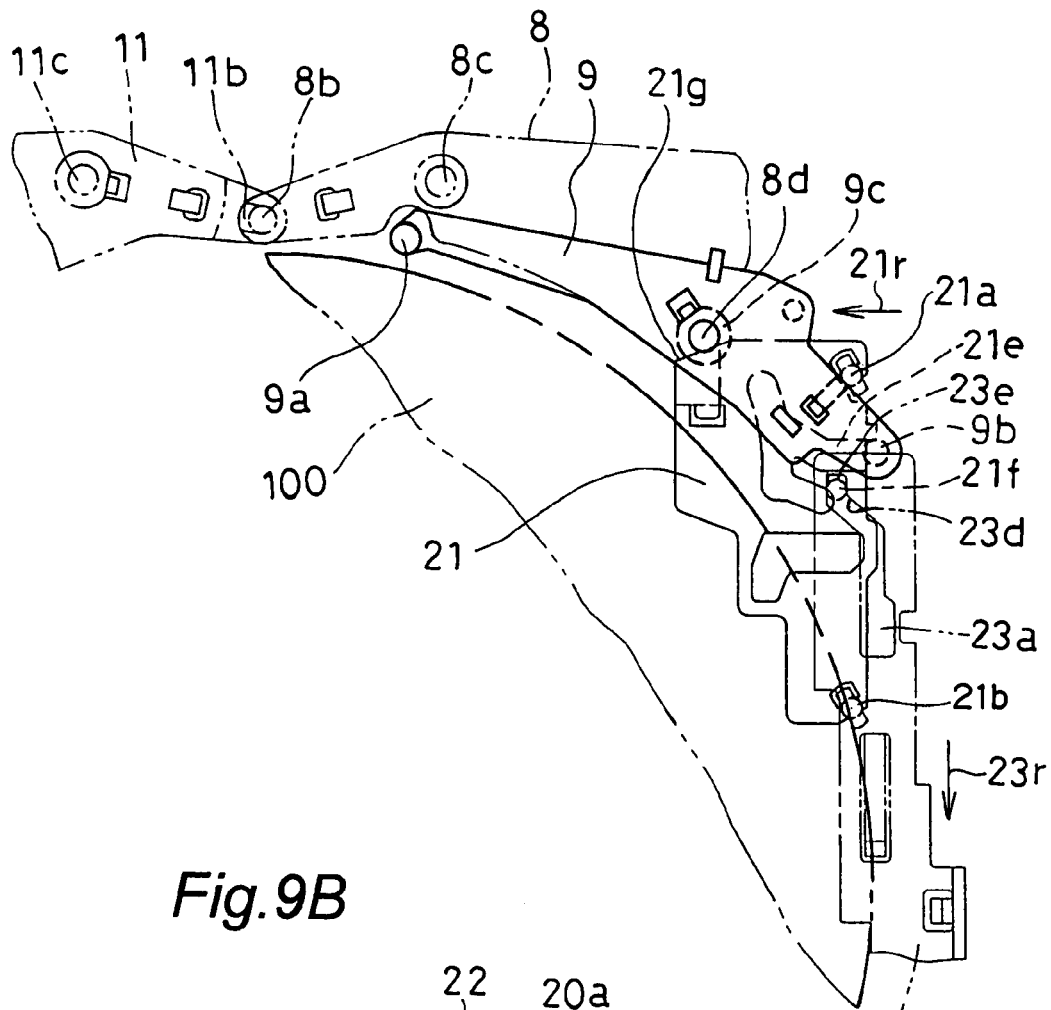
FIG. 9A is a partial top view showing a state of the trigger lever after completion of mounting of the disk in the disk loading device of the first embodiment of the present invention.
Figure 9B:
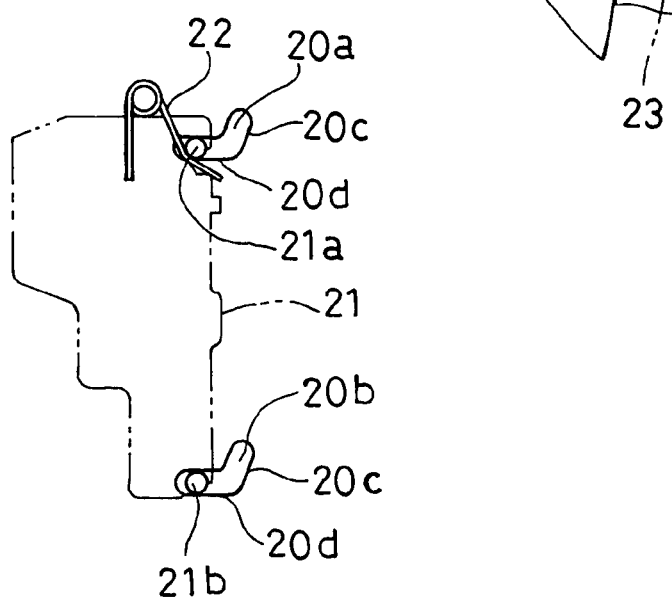
FIG. 9B is an explanatory view of movement of the trigger rod in FIG. 9A.

Furthermore, if the cam rod 23 moves in the direction of the arrow 23r from the state shown in FIG. 8A due to driving by the motor 24, a fitted state of a pin 21f of the trigger rod 21 changes from the state shown in FIG. 8A into the state shown in FIG. 9A and reaches an uppermost portion 23e while guided by an oblique portion 23d of a groove cam 23a that is an example of a cam. Because the pin 21f is pushed leftward in FIGS. 8A and 9A in the oblique portion 23d in the process of this movement, the trigger rod 21 moves in a direction of an arrow 21r. Here, due to a shift from the state in FIG. 8A to the state in FIG. 9A, the guide pins 21a, 21b move leftward in FIGS. 8A and 9A while guided by the guide portions 20d of the guide holes 20a, 20b as shown in FIG. 9B. Therefore, a cam 21g formed by an upper oblique side of the trigger rod 21 in FIGS. 8A and 9A pushes the shaft 8d of the right centering lever 8 upward. As a result, the right centering lever 8 turns counterclockwise about the fulcrum 8c as a center of turning and the trigger lever 9 turns clockwise about the driving pin 9b fitted in the groove cam 21e. Therefore, the disk engaging pin 9a at the tip end is separated from the outer periphery of the disk 100 (FIGS. 9A and 6).

As shown in FIG. 6, if the right centering lever 8 turns counterclockwise about the fulcrum 8c as the center of turning, the left centering lever 11 coupled to the right centering lever 8 by the engaging pin 8b turns clockwise about the fulcrum 11c as the center of turning. As a result, the disk positioning pins 8a and 11a are separated from the outer periphery of the disk 100. The detecting lever 12 also turns clockwise and the disk detecting pin 12a is separated from the outer periphery of the disk. Positions to which the trigger lever 9 and the disk detecting lever 12 retreat away from the outer periphery of the disk, i.e., positions to which the levers 9 and 12 retreat outside the large-diameter disk-mounted-area 1d are referred to as "retreat positions". When the above operation is completed, the mounting of the large-diameter disk 100 is completed. In this process, movement of the above-described cam rod 23 in the direction of the arrow 23r actuates the switch 51 facing the cam rod 23 in the state shown in FIG. 18 to stop the motor 24 as shown in FIGS. 16 to 18.

In the first embodiment, the driving apparatus (cam rod driving apparatus) has the rack 23m, the gear train 34a, 34, 33, 32, the worm gear 31, the turning shaft 29, the worm wheel B30, the worm pulley 27, the belt 26, and the motor 24. However, the present invention is not limited to the above configuration and it is essential only that driving force be applied to the cam rod 23 after the initial movement to move the cam rod 23 so as to separate the disk engaging pin 9a of the trigger lever 9 from the outer periphery of the disk 100.

Neither is the driving mechanism limited to the above configuration. It is essential only that the mechanism be able to move the disk down after insertion to mount the disk in the disk mounted position.

Next, operation when the small-diameter disk 120 of the standardized diameter of 8 cm is mounted in the disk loading device will be described with reference to FIGS. 10 to 18. A lateral width of the disk insertion slot 5 of the disk loading device is slightly longer than the diameter of the large-diameter disk 100. Therefore, when a user inserts the disk 120 into the disk loading device, it is unknown which part of the insertion slot 5 the disk 120 is inserted into. For example, in an example shown in FIG. 10, the disk 120 is inserted into a left part of the insertion slot 5. In an example shown in FIG. 11, the disk 120 is inserted into a right part of the insertion slot 5.

In the disk loading device of the first embodiment, it is possible to position the disk 120 in the disk mounted position irrespective of which part of the insertion slot 5 the disk 120 is inserted into.

Figure 10:
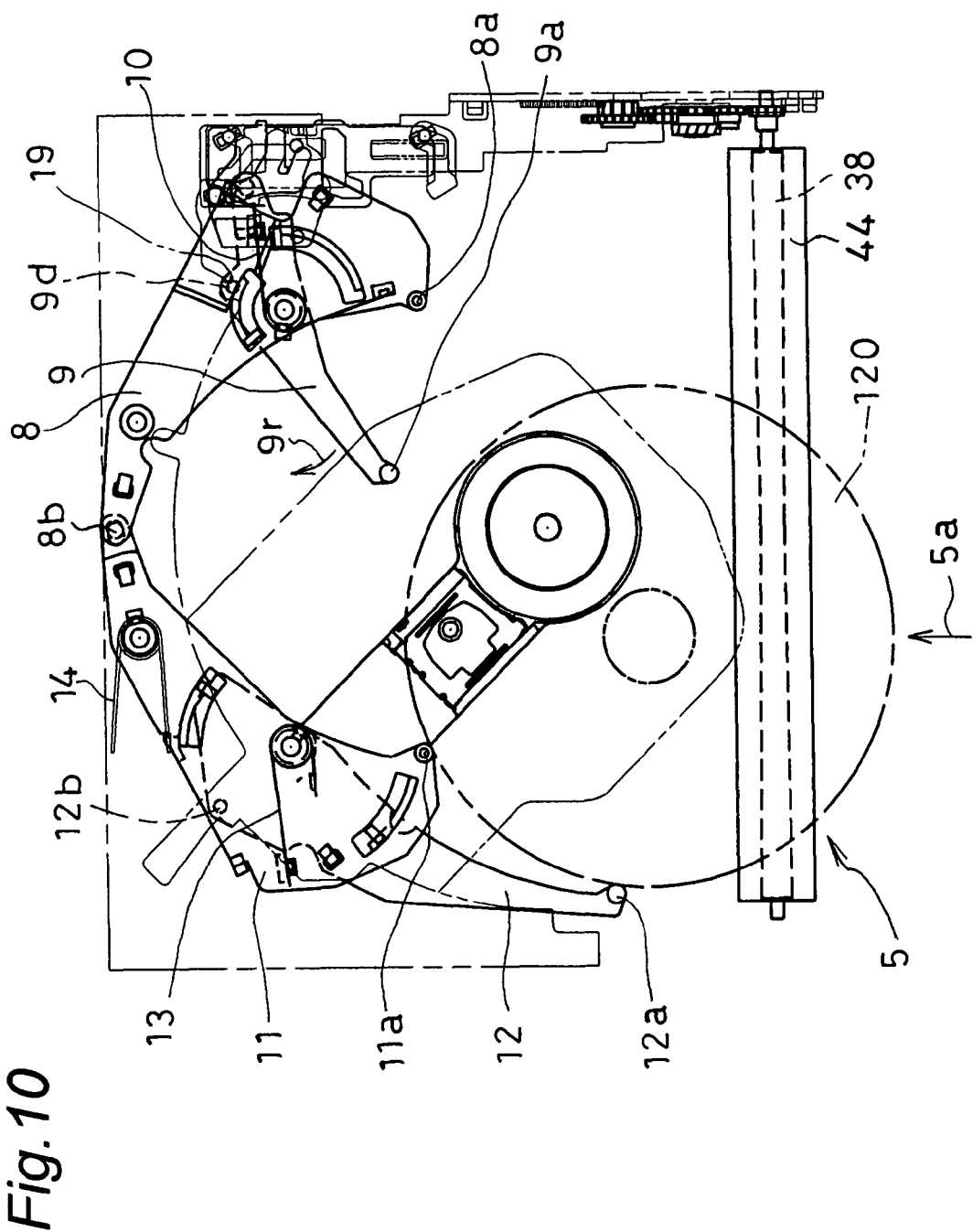
FIG. 10 is a partial top view when a small-diameter disk is inserted from a left side of an insertion slot in the disk loading device of the first embodiment of the present invention.

With reference to FIG. 10, operation when the disk 120 is inserted into the left part of the insertion slot 5 will be described. FIG. 10 shows a state in which the disk 120 has come in contact with the disk positioning pin 11a of the left centering lever 11 after inserted.

In FIG. 10, if the user inserts the disk 120 into the insertion slot 5, the switch 50 (FIG. 1) is closed and the motor 24 starts rotating before the disk 120 comes in contact with the rubber roller 38 similarly to the case of insertion of the large-diameter disk 100. The rotation of the motor 24 causes the rubber roller 38 to rotate. If the disk 120 is further pushed in, the disk 120 is sandwiched between the rotating rubber roller 38 and the guide rod 44 fixed to the clamp lever 43 and the disk 120 is inserted in the direction of the arrow 5a and enters the disk loading device. The disk 120 first comes in contact with and pushes the disk detecting pin 12a of the disk detecting lever 12 and therefore the disk detecting lever 12 turns a small amount clockwise and the cam pin 12b becomes detached from the left stopper 18. Next, the disk 120 comes in contact with and pushes the disk positioning pin 11a of the left centering lever 11. The disk positioning pin 11a is pushed by the disk 120 and tries to turn clockwise in FIG. 10. However, the coupled right centering lever 8 is locked by engagement between the cam pin 9d of the trigger lever 9 mounted to the shaft 8d for turning and the right stopper 19 formed on the support board 15 and therefore the disk 120 is further inserted while in contact with the disk positioning pin 11a and moving rightward.

Then, the disk 120 comes in contact and pushes the disk engaging pin 9a of the trigger lever 9 to turn the pin 9a in the direction of the arrow 9r. Thus, the cam pin 9d becomes detached from the right stopper 19 and the right centering lever 8 is unlocked. However, as the disk moves rightward, the disk 120 and the disk detecting pin 12a of the disk detecting lever 12 are separated from each other. Therefore, the disk detecting lever 12 turns counterclockwise and returns due to the biasing force of the disk detecting lever spring 13 and the cam pin 12b returns into engagement with the left stopper 18. As a result, the left centering lever 11 is locked and the disk positioning pin 11a does not move. Therefore, the disk 120 comes in contact with the disk positioning pin 8a and stops entering. At this time, the disk 120 is also in contact with the left disk positioning pin 11a and the disk 120 is positioned in the disk mounted position due to contact with the two disk positioning pins 8a, 11a as shown in FIG. 12.

Next, with reference to FIG. 11, operation when the disk 120 is inserted into the right part of the insertion slot 5 will be described. The inserted disk 120 first comes in contact with the disk positioning pin 8a of the right centering lever 8. The disk positioning pin 8a does not move because the cam pin 9d of the trigger lever 9 comes in contact with the right stopper 19. Therefore, the disk 120 moves to the upper left in FIG. 11 while comes in contact with the disk positioning pin 8a. When the disk 120 comes in contact with the disk engaging pin 9a, the disk 120 moves while pushing the disk engaging pin 9a, and the trigger lever 9 turns in the direction of the arrow 9r. Therefore, the cam pin 9d of the trigger lever 9 becomes detached from the right stopper 19. However, the coupled left centering lever 11 is locked and therefore the disk 120 comes in contact with the disk positioning pin 11a of the left centering lever 11 and stops to be positioned as shown in FIG. 12. In other words, the disk 120 is positioned by the disk positioning pins 8a and 11a similarly to the case of insertion in the state in FIG. 10.

Figure 11:
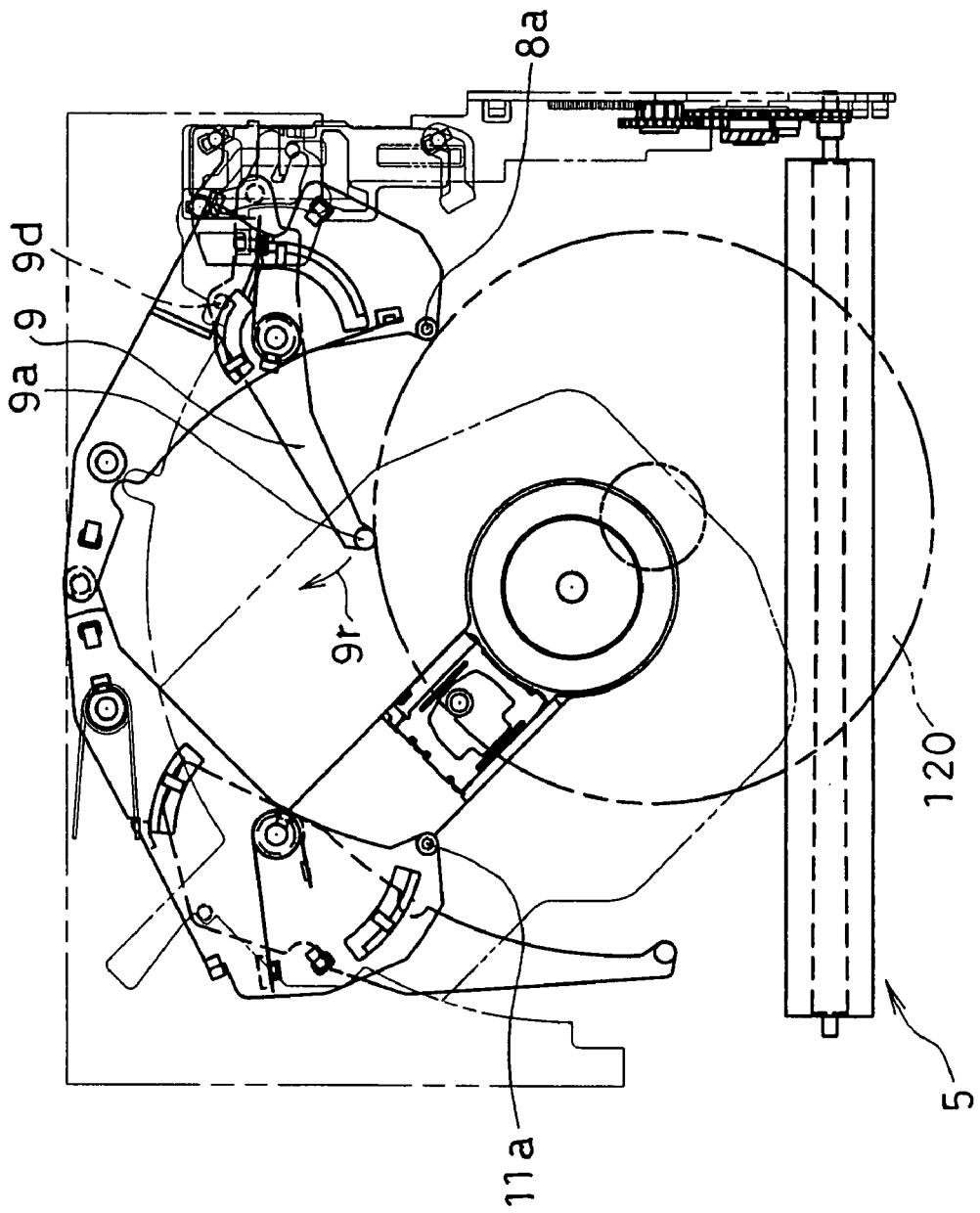
FIG. 11 is a partial top view when the small-diameter disk is inserted from a right side of the insertion slot in the disk loading device of the first embodiment of the present invention.
Figure 12:
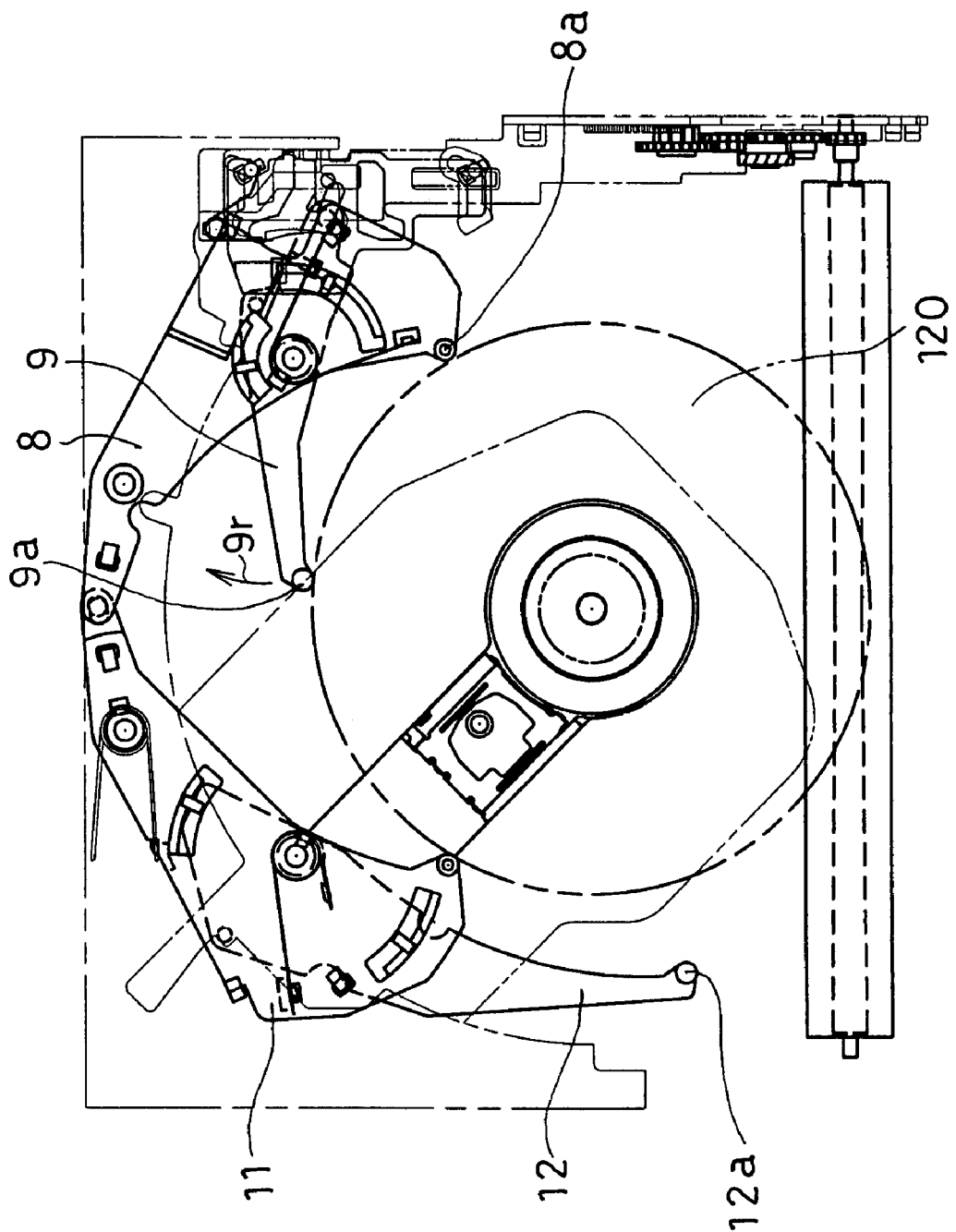
FIG. 12 is a partial top view showing a state during insertion of a small-diameter disk in the disk loading device of the first embodiment of the present invention.

In the above-described operation, in each of the cases in FIGS. 10 and 11, the trigger lever 9 turns in the direction of the arrow 9r immediately before the disk 120 comes in contact with the disk positioning pins 8a and 11a and is finally positioned to come into the state in FIG. 12. The operation of the trigger lever 9 will be described with reference to FIGS. 12 to 15.

Figure 14A:
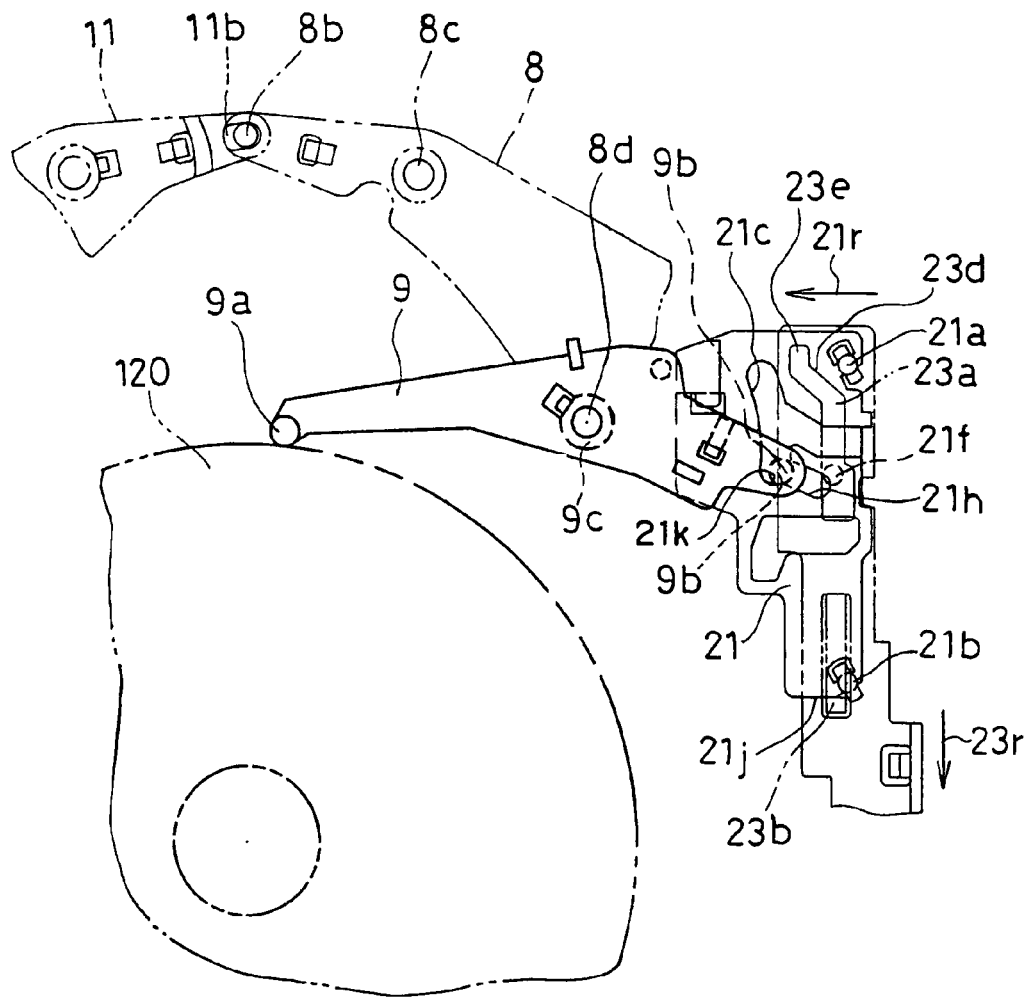
FIG. 14A is a partial top view showing operation of a trigger lever during insertion of the small-diameter disk in the disk loading device of the first embodiment of the present invention.
Figure 14B:
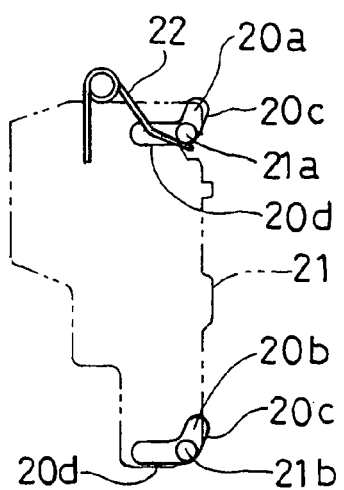
FIG. 14B is an explanatory view of movement of a trigger rod in FIG. 14A.

When the small-diameter disk 120 is positioned and comes into the state in FIG. 12, the trigger lever 9 is in a state shown in FIG. 14A. In other words, the trigger lever 9 has moved from an initial position to a trigger position. The state is resulted from a change from the state in FIG. 7A showing the state before insertion of the small-diameter disk 120. In the process of the change of the state from FIG. 7A to FIG. 14A, the driving pin 9b of the trigger lever 9 moves from the groove cam 21c to an entrance wall 21k of a groove cam 21h and pushes the trigger rod 21 in the direction of the arrow 23r as shown in FIG. 14A due to turning of the trigger lever 9. As a result of this movement, the guide pins 21a, 21b move from the upper ends to the lower ends of the oblique guide portions 20c of the guide holes 20a, 20b against the biasing force of the biasing pin 22 as shown in FIG. 14B. In this way, as shown in FIG. 14A, the end face 21j of the trigger rod 21 pushes the pin 23b of the cam rod 23 in the direction of the arrow 23r and the cam rod 23 makes an initial movement in the downward direction in FIG. 14A. As a result, similarly to the above-described case of the large-diameter disk 100, the rack 23m provided to the cam rod 23 out of engagement with the driving pinion 34a before the initial movement as shown in FIG. 16 comes into engagement with the driving pinion 34a after the initial movement as shown in FIG. 17. Because the driving pinion 34a is driven by the motor 24, the driving pinion 34a further moves the cam rod 23 in the direction of the arrow 23r. As a result, the cam rod 23 changes from the state shown in FIG. 14A into the state shown in FIG. 15A and the pin 21f reaches the uppermost portion 23e while guided by the oblique portion 23d of the groove cam 23a. Because the pin 21f is pushed leftward by the oblique portion 23d in the process of this movement, the trigger rod 21 moves in the direction of the arrow 21r. Due to a change from the state in FIG. 14A to the state in FIG. 15A, the guide pins 21a, 21b move leftward in FIG. 15B while guided by the guide portions 20d of the guide holes 20a, 20b as shown in FIG. 15B. As a result of this movement, the driving pin 9b is guided by the oblique portion of the groove cam 21h and is turned clockwise about the driving pin 9c as a fulcrum by an oblique face of the oblique portion. Therefore, the disk engaging pin 9a also turns in the direction of the arrow 9r to move from the trigger position to the retreat position and is separated from the outer periphery of the disk 120 as shown in FIG. 15A. The top view in FIG. 13 shows a state in which the disk engaging pin 9a is separated from the outer periphery of the disk 120. At this time, the disk positioning pins 8a and 11a are in contact with the outer periphery of the disk 120.

Next, operation of separation of the disk positioning pins 8a and 11a from the outer periphery of the disk 120 will be described with reference to FIGS. 16 to 18.

FIGS. 16 to 18 are right side views of FIG. 13. As shown in FIG. 17, the disk positioning pin 8a has a large-diameter portion 8m and a small-diameter portion 8n having a smaller diameter than the large-diameter portion 8m. As specific dimensions, the diameter of the large-diameter portion 8m is 3 mm and the diameter of the small-diameter portion 8n is 1 mm, for example. In positioning of the disk 120 as shown in FIGS. 10 to 13, heights of the disk 120 and the disk positioning pins 8a and 11a are set so that the outer peripheral portion of the disk 120 comes in contact with the large-diameter portion 8m.

During the inserting operation of the disk 120 shown in FIGS. 12 and 13, the cam rod 23 makes the initial movement in the direction of the arrow 23r from the state shown in FIG. 14A into the state shown in FIG. 15A. As a result of the initial movement of the cam rod 23, as described above, the rack 23m provided to the cam rod 23 out of engagement with the driving pinion 34a before the movement as shown in FIG. 16 comes into engagement with the driving pinion 34a as shown in FIG. 17. Because the gear train 34, 34a, 33, 32, and 35 are rotated by the driving force of the motor 24 through the belt 26, the worm pulley 27, the worm wheel B30, the turning shaft 29, and the worm gear 31, the cam rod 23 receives the driving force of the motor 24 through the rack 23m and further moves in the direction of the arrow 23r. As a result of this movement of the cam rod 23, the shaft 36 of the roller gear 37 moves downward as shown in FIG. 18 while guided by the oblique hole portion 23n formed in the cam rod 23. As a result, the rubber roller 38 is caused to retreat downward. At this time, because the relay gear A35 and the roller gear 37 are disengaged from each other, rotation of the rubber roller 38 retained by the roller shaft 36 mounted with the roller gear 37 stops. In synchronization with the downward movement of the roller gear 37, the clamp lever 43 turns in the direction shown by the arrow 43r about a shaft 43a while guided by an oblique hole 23p of the cam rod 23. As a result, the retaining leaf spring 45 which an overall shape thereof is shown in FIG. 2 and which is mounted to the clamp lever 43 moves in a direction shown by an arrow 45r (FIG. 18) and the clamper 46 mounted to a lower face of the retaining leaf spring 45 pushes down the disk 120 about 3 mm in the direction shown by the arrow 45r. As a result, the central hole of the disk 120 is fitted over the turntable 47a (FIGS. 2 and 3). As a result of pushing down of the disk 120, an inner periphery of the disk 120 moves away from the large-diameter portion 8m and faces the small-diameter portion 8n with a clearance maintained between the inner peripheral of the disk 120 and the small-diameter portion 8n so as to keep the inner peripheral face of the disk 120 from contact with the small-diameter portion 8n. As a result of the above operation, the outer periphery of the disk 120 moves away from the disk positioning pins 8a and 11a to become rotatable.

Description of operation for taking the mounted disk 100 or 120 out of the disk loading device will be omitted.

With the present invention, when the large-diameter disk 100 is mounted into the disk loading device, all components of the disk positioning mechanism including the right centering lever 8, the trigger lever 9, the left centering lever 11, and the disk detecting lever 12 for positioning the disk 100 exist outside the mounted area 1d of the disk 100 and do not exist above the upper face of the disk 100. Therefore, it is possible to see the upper face of the disk 100 through the opening portions 2a, 2b of the sub chassis 1 shown in FIGS. 1 and 2.

When the small-diameter disk 120 is mounted, the right centering lever 8 and the left centering lever 11 are inside the mounted area 1d but are away from the outer periphery of the small-diameter disk 120. Therefore, it is possible to see the upper face of the disk 120 through the opening portions 2a, 2b. Because the components of the disk positioning mechanism do not exist above the upper face of the disk 100 or 120, it is possible to reduce a clearance between the upper face and the sub chassis 1 to such a degree that the disk 100 or 120 does not come in contact during rotation. Thus, it is possible to reduce a thickness of the disk loading device (slimming down).

Second Embodiment

Next, a disk loading device of a second embodiment of the present invention will be described with reference to FIGS. 19 to 28.

Figure 19:
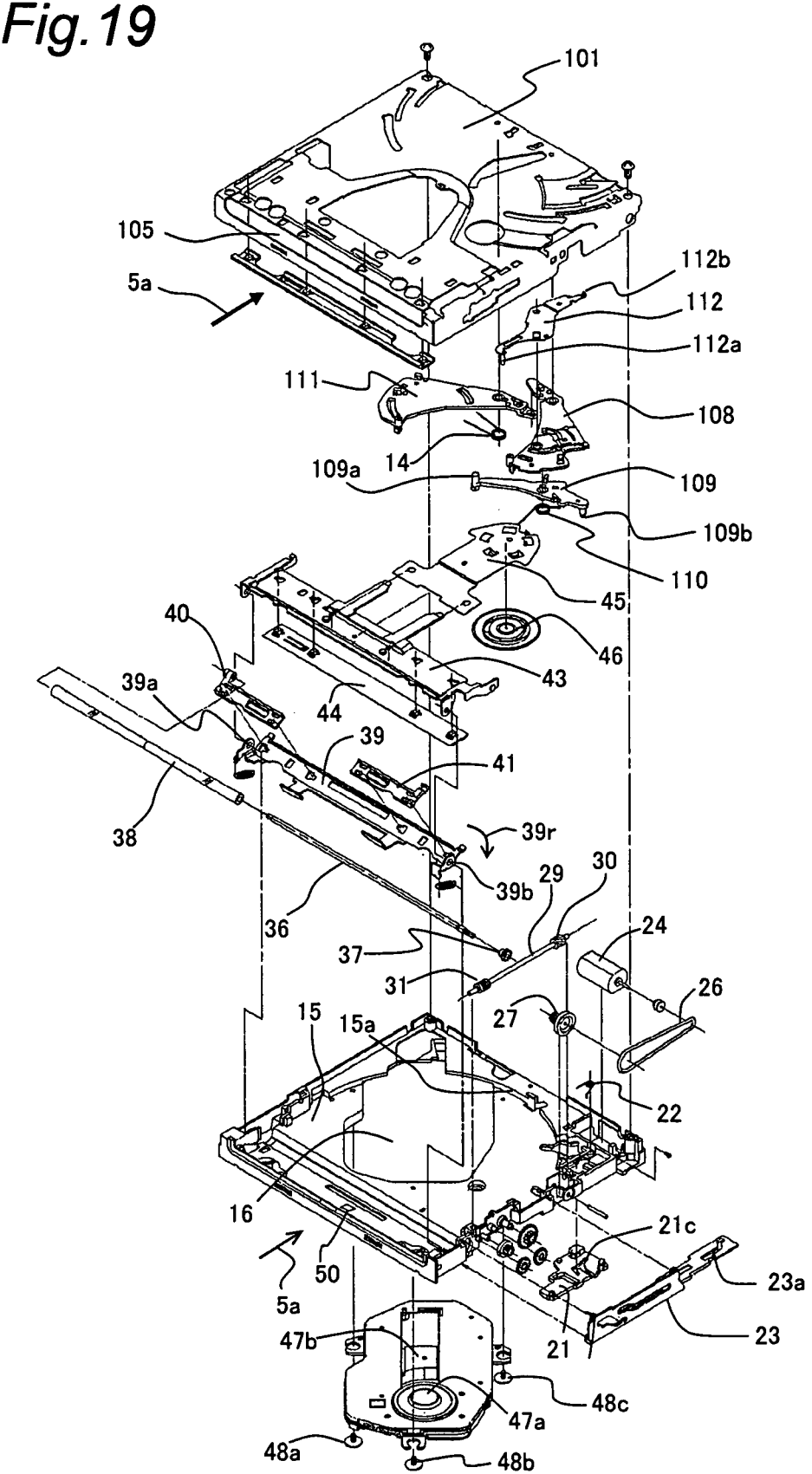
FIG. 19 is an exploded perspective view of a disk loading device of a second embodiment of the present invention.
Figure 20:
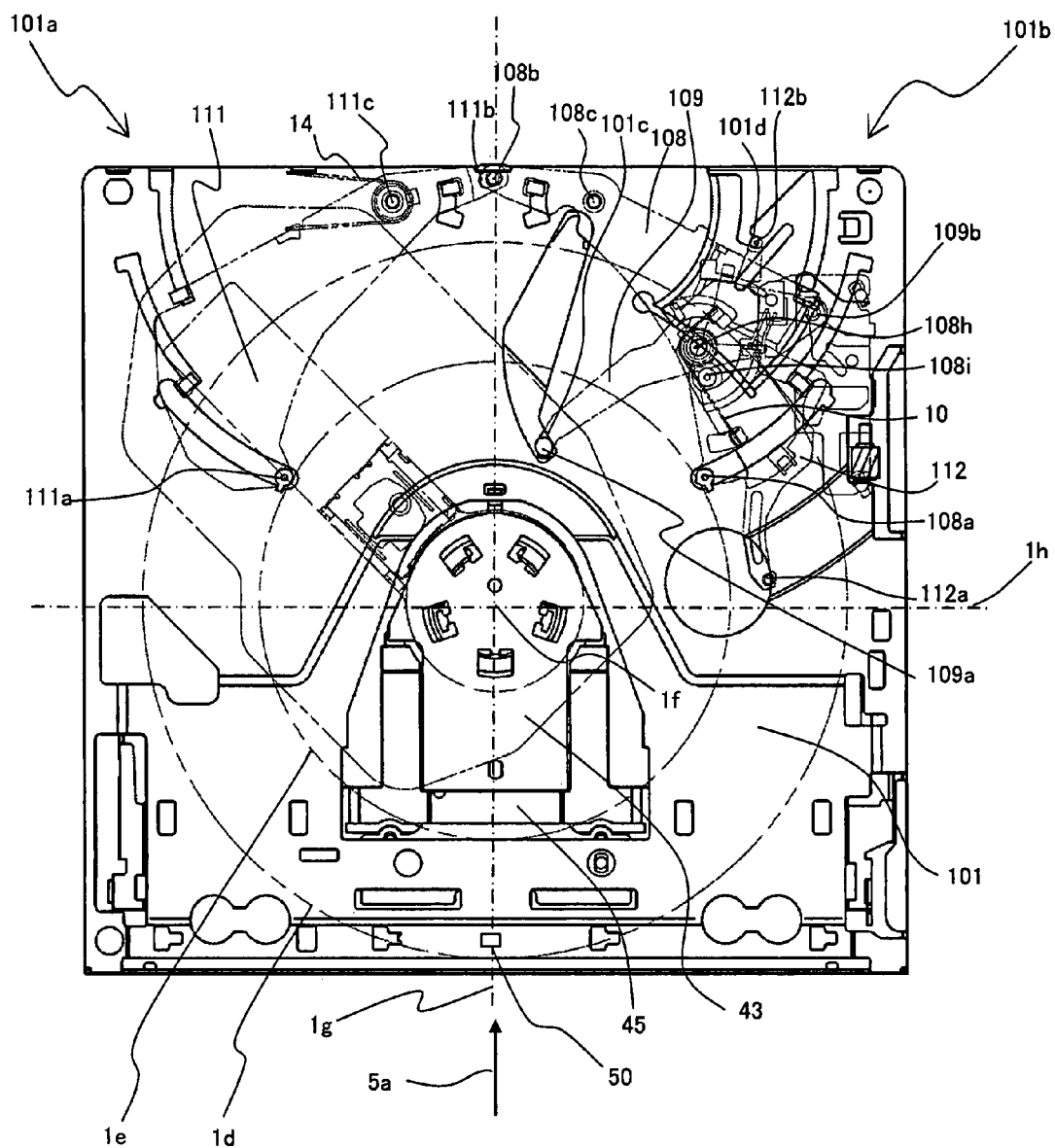
FIG. 20 is a top view showing a standby state in the disk loading device of the second embodiment of the present invention.
Figure 21:
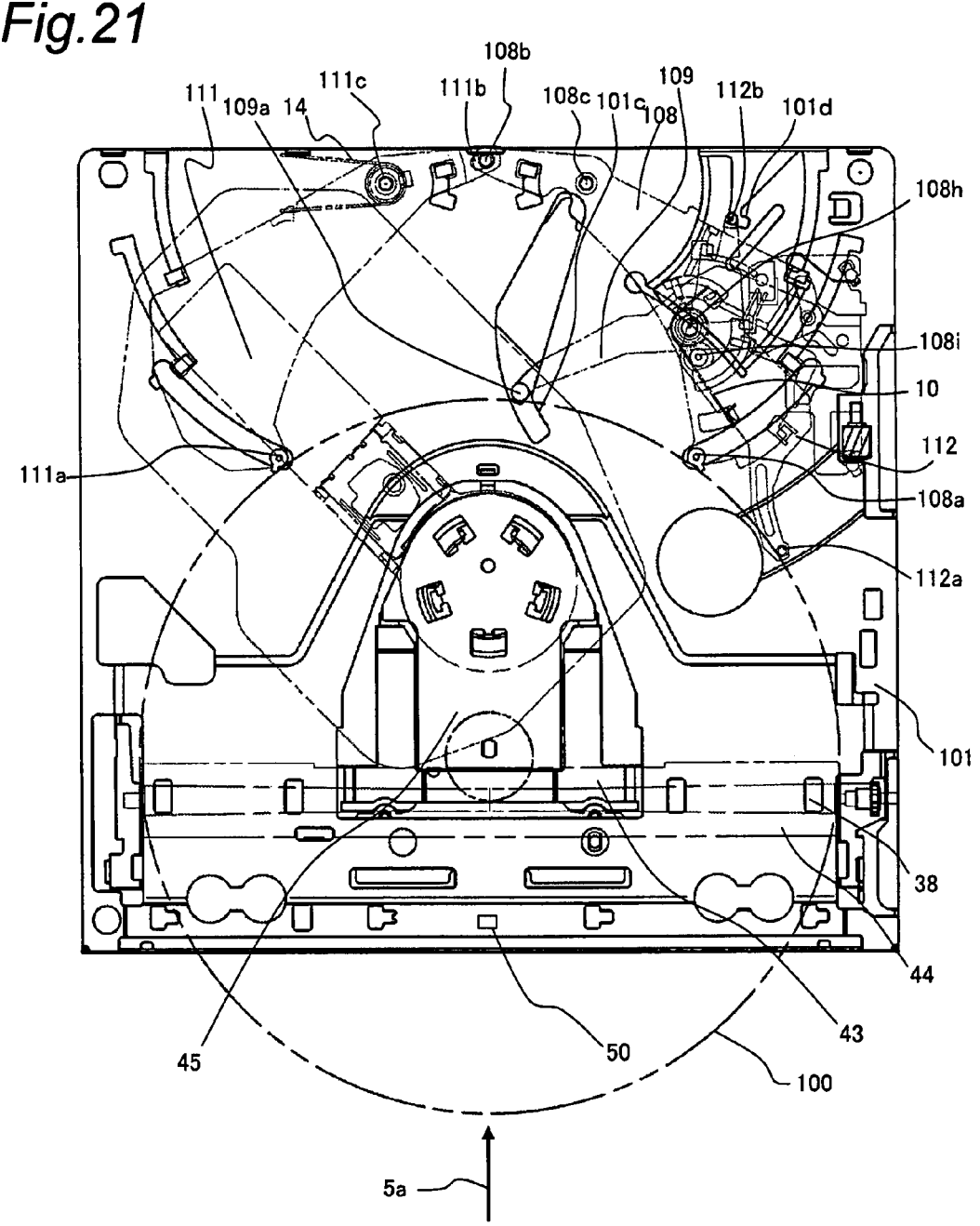
FIG. 21 is a top view showing a state of insertion of the large-diameter disk in the disk loading device of the second embodiment of the present invention.
Figure 22:
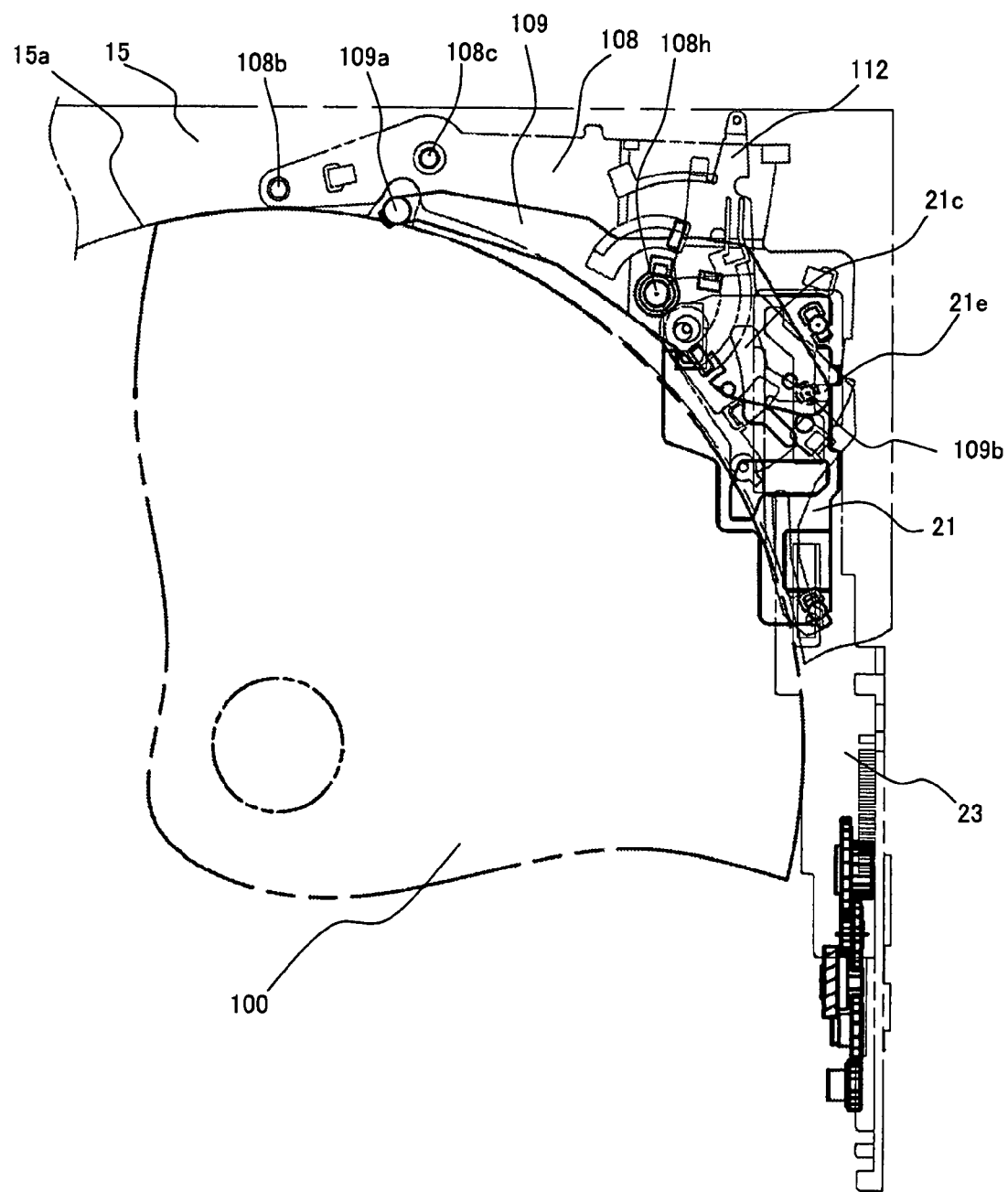
FIG. 22 is a partial top view showing operation of a trigger rod during insertion of the large-diameter disk in the disk loading device of the second embodiment of the present invention.
Figure 23:
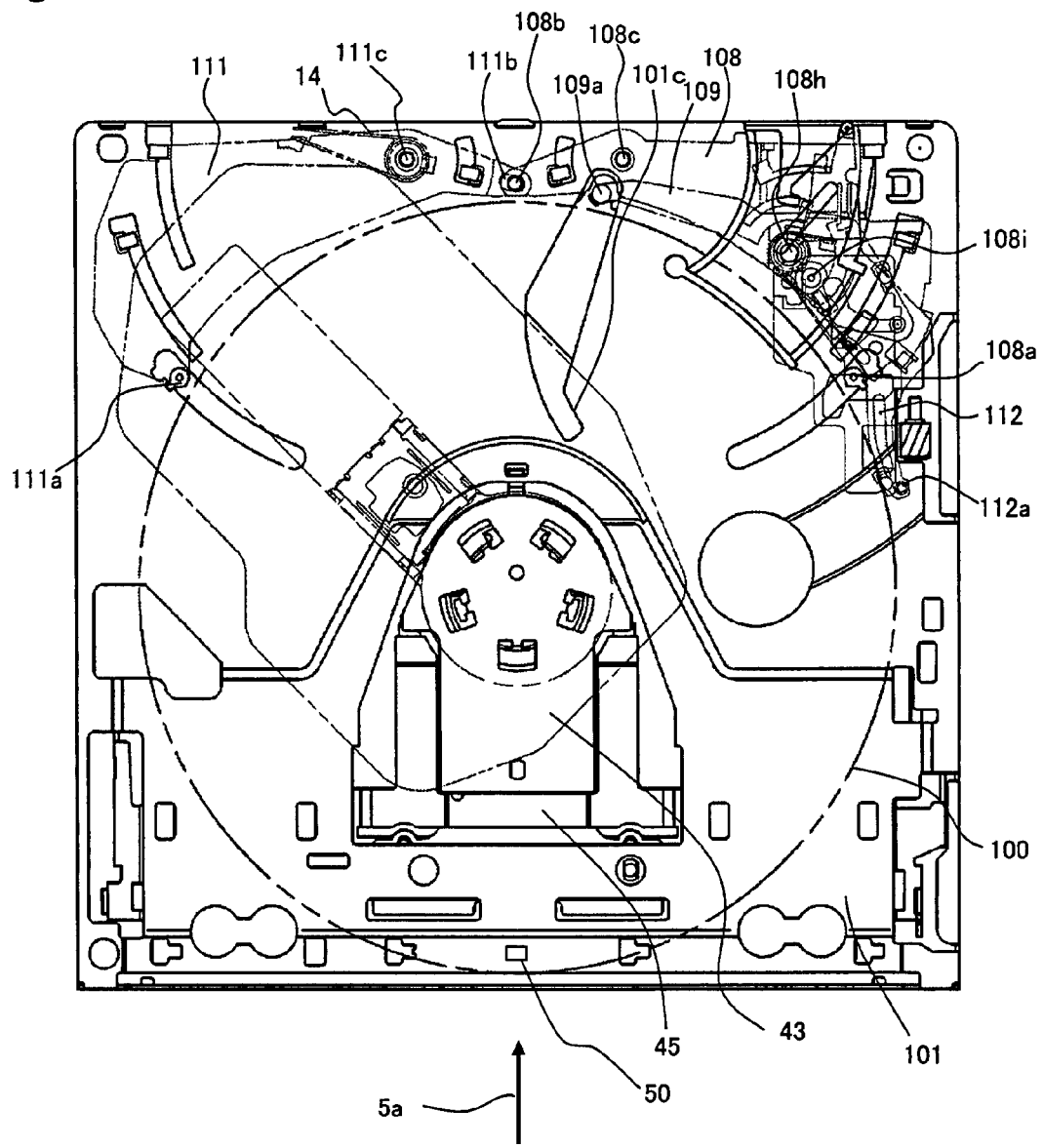
FIG. 23 is a top view showing a state of completion of mounting of the large-diameter disk in the disk loading device of the second embodiment of the present invention.

FIG. 19 is an exploded perspective view of the disk loading device of the second embodiment and FIG. 20 is a top view showing a standby state before insertion of a disk. FIG. 21 is a top view showing operation during insertion of the large-diameter disk 100 of standardized diameter of 12 cm into the disk loading device. FIG. 22 is a partial top view showing movement of a trigger lever 109 during insertion of the large-diameter disk 100. FIG. 23 is a top view showing a state of the disk loading device after completion of mounting of the large-diameter disk 100. FIG. 24 and FIGS. 26 to 28 are top views of the disk loading device and showing operation when the small-diameter disk 120 of standardized diameter of 8 cm is inserted. FIG. 25 is a partial top view showing operation of the trigger lever 109 during mounting of the small-diameter disk 120.

As shown in FIG. 19, the disk loading device of the second embodiment is different from the disk loading device of the first embodiment in that it includes a sub chassis 101, a right centering lever 108, a trigger lever 109, a left centering lever 111, and a disk detecting lever 112 instead of the sub chassis 1, the right centering lever 8, the trigger lever 9, the left centering lever 11, and the disk detecting lever 12 and that it does not include the biasing spring 13. Other parts are similar to those of the disk loading device of the first embodiment and perform similar operations and therefore descriptions of the common portions will be omitted.

In FIGS. 19 and 20, the disk loading device of the second embodiment is formed by mounting respective parts shown in FIG. 19 into a housing formed of a lowermost support board 15 and an uppermost sub chassis 101.

An area occupied by the large-diameter disk 100 mounted in the disk loading device is referred to as a "large-diameter disk-mounted-area 1d", an area occupied by the small-diameter disk 120 is referred to as a "small-diameter disk-mounted-area 1e", and these areas are shown in two-dot chain lines in FIG. 20.

In FIG. 19, the trigger lever 109 that is an example of a fourth detecting lever and a disk detecting lever 112 that is an example of a third detecting lever shown below the sub chassis 1 in FIG. 19 are a group of levers for coming in contact with the outer periphery of the disk 100 or 120 inserted in a direction of an arrow 5a from the insertion slot 5 to thereby detect insertion of the disk 100 or 120 into the disk loading device. Moreover, a right centering lever 108 that is an example of a fourth positioning lever and a left centering lever 111 that is an example of a third positioning lever are a group of levers for coming in contact with the outer periphery of disk 120 inserted in the direction of the arrow 5a from the insertion slot 5 to position the disk 120 in a disk mounted position.

In the disk loading device of the second embodiment, as will be specifically described later, turning shafts of the right centering lever 108 and the left centering lever 111 are mounted in an upper left corner portion 101a and an upper right corner portion 101b and outside the large-diameter disk-mounted-area 1d of the sub chassis 101 that is an example of a first board shown in FIG. 20. The turning shaft 108c of the right centering lever 108 and the turning shaft 111c of the left centering lever 111 may be mounted to the support board 15 that is an example of a second board.

In FIG. 20, the right centering lever 108 is mounted to the sub chassis 101 so as to be able to turn about a turning shaft hole 108c. The trigger lever 109 is mounted to a turning shaft 108h provided to the right centering lever 108 so as to be able to turn. The left centering lever 111 is mounted to the sub chassis 101 so as to be able to turn about a turning shaft hole 111c. The disk detecting lever 112 is mounted to a turning shaft 108i of the right centering lever 108 so as to be able to turn. Here, the right centering lever 108 and the left centering lever 111 have functions as first and second positioning levers for carrying out positioning of the disk 120 at the time of insertion.

With reference to FIGS. 20 to 23, operation when the large-diameter disk 100 is mounted into the disk loading device of the second embodiment will be described. FIGS. 20 to 23 are plan views of the disk loading device and showing only components related to the inserting operation of the disks 100 and 120.

FIG. 20 shows the standby state before insertion of the disks 100 and 120. A disk contact pin 109a (hereafter referred to as "contact pin 109a") that is an example of a second engaging portion of the trigger lever 109 is positioned on an opposite side of a restricting wall 101c to the turning shaft 108h, the restricting wall 101c being an example of a second restricting portion provided to the sub chassis 101 and a small clearance maintained between the contact pin 109a and the restricting wall 101c so that the pin 109a can slide. The restricting wall 101c is formed in an arc shape, positioned around the turning shaft 108h as a center, and provided so that the clearance between the contact pin 109a and the restricting wall 101c is maintained in substantially the same state when the trigger lever 109 turns. A straight line connecting the turning shaft hole 108c of the right centering lever 108 and a center of the turning shaft 108h and a straight line connecting a center of the contact pin 109a of the trigger lever 109 in the standby state (initial position) and the turning shaft 108h are provided at substantially right angles to each other. The contact pin 109a is inside the small-diameter disk-mounted-area 1e. A disk engaging pin 112b that is an example of a first engaging portion of the disk detecting lever 112 is in a position facing a restricting wall 101d that is an example of a first restricting portion of the sub chassis 101 and a disk contact pin 112a (hereafter referred to as "contact pin 112a") is on standby in a position outside the small-diameter disk-mounted-area 1e and inside the large-diameter disk-mounted-area 1d.

A disk positioning pin 111a that is an example of a positioning pin of the left centering lever 111 is positioned immediately inside a left rim of the large-diameter disk-mounted-area 1d. A disk positioning pin 108a of the right centering lever 108 is positioned immediately inside a right rim of the large-diameter disk-mounted-area 1d. The disk positioning pins 108a and 111a are provided to be in contact with an outside of the small-diameter disk-mounted-area 1e. The disk positioning pin 108a of the right centering lever 108 and the disk positioning pin 111a of the left centering lever 111 are disposed to be line-symmetric with respect to a line 1g passing through a center 1f of the large-diameter disk-mounted-area 1d in a disk inserting direction 5a and are disposed downstream in the disk inserting direction from a line 1h passing through the center 1f and orthogonal to the line 1g as shown in FIG. 20.

The trigger lever 109 is biased counterclockwise by one end of a biasing spring 10 about the turning shaft 108h and the disk detecting lever 112 is biased counterclockwise by the other end of the biasing spring 10 about the turning shaft 108i. The left centering lever 111 is biased counterclockwise by a centering lever spring 14 about the turning shaft hole 111c. With these springs 10 and 14, the contact pins 109a, 112a, and the disk positioning pin 111a are stably retained in the above-described state. The right centering lever 108 is coupled to an engaging hole 111b in the left centering lever 111 by an engaging pin 108b provided to an end portion on a side opposite to the disk positioning pin 108a. Therefore, the right centering lever 108 is biased clockwise about the turning shaft hole 108c by the left centering lever 111. With this biasing, the disk positioning pin 108a is stably retained in the above-described state.

If the disk 100 is inserted in the direction of the arrow 5a from the insertion slot 105 shown in FIG. 19, a switch 50 is actuated into a closed state before the disk 100 comes in contact with the rubber roller 38. When the switch 50 is closed, the motor 24 is energized and rotated and the rubber roller 38 is rotated by rotation of the motor 24. Moreover, when the disk 100 is pushed into the disk loading device, the rotating rubber roller 38 is pushed downward by a thickness of the disk 100. Therefore, the disk 100 is sandwiched between the guide rod 44 fixed to the clamp lever 43 and the rubber roller 38 and is inserted in the direction of the arrow 5a in FIG. 19.

The disk 100 inserted by driving of the rubber roller 38 further moves in the direction of the arrow 5a after an outer periphery of the disk 100 comes in contact with the contact pin 109a of the trigger lever 109 and the contact pin 112a of the disk detecting lever 112. The state in which the outer periphery of the disk 100 has just come in contact with the disk positioning pins 108a and 111a is shown in FIG. 21.

In a process of a change from the state in FIG. 20 to the state in FIG. 21, the contact pin 112a of the disk detecting lever 112 pushed by the disk 100 turns counterclockwise about the turning shaft 108i. Due to turning of the disk detecting lever 112, the engaging pin 112b also turns similarly counterclockwise and becomes detached from the restricting wall 101d. The trigger lever 109 turns clockwise about the turning shaft 108h with its contact pin 109a pushed by the outer periphery of the disk 100 and the contact pin 109a becomes detached from the restricting wall 101c. FIG. 21 shows a state in which the contact pin 109a and the engaging pin 112b are detached from the restricting walls 101c, 101d.

With the above operation, the trigger lever 109 and the disk detecting lever 112 provided to the right centering lever 108 are released from restriction by the restricting walls 101c, 101d of the sub chassis 101 and therefore the right centering lever 108 can turn counterclockwise about the turning shaft hole 108c. The left centering lever 111 engaged with the right centering lever 108 through the engaging hole 111b can turn in synchronization with the right centering lever 108.

When the disk 100 is further inserted in the direction of the arrow 5a, the disk positioning pins 108a, 111a are pushed by the outer periphery of the disk 100. At this time, the right centering lever 108 and the left centering lever 111 can turn and therefore open along the outer periphery of the disk 100. The disk contact pins 109a, 112a similarly open along the outer periphery of the disk 100. Furthermore, if the disk 100 is inserted into the disk loading device by the rubber roller 38, the disk 100 comes in contact with a wall 15a (FIG. 19) of the support board 15 and stops. At this time, the right centering lever 108 and the left centering lever 111 are pushed outside the large-diameter disk-mounted-area 1d. Moreover, the trigger lever 109 and the disk detecting lever 112 having centers of turning on the right centering lever 108 are also similarly pushed outside the large-diameter disk-mounted-area 1d and come into the state shown in FIG. 22.

Similarly to the first embodiment, by moving the clamper 46 shown in FIG. 19 toward the turntable 47a of the traverse 47 in this state, the turntable 47a enters the central hole of the disk 100 and is mounted to the disk 100. Then, the disk positioning pins 108a, 111a, the contact pins 109a, and 112a are separated from the outer periphery of the disk 100 by the operation which will be described later. In other words, the trigger lever 109 and the disk detecting lever 112 retreat in retreat positions. This state is shown in FIG. 23. In this state, the switch 50 is actuated to stop the motor 24 and mounting of the disk 100 is completed.

Next, operation of the trigger lever 109 after insertion of the disk 100 will be described in detail with reference to FIG. 22. A driving pin 109b of the trigger lever 109 is engaged with the groove cam 21c formed in the trigger rod 21. The mounted state and operation of the trigger rod 21 are similar to those in the first embodiment shown in FIGS. 7A, 7B, 8A, and 8B.

If the trigger lever 109 and the right centering lever 108 turn while pushed by the outer periphery of the inserted disk 100, the driving pin 109b of the trigger lever 109 moves in an opposite direction to the disk inserting direction 5a and also moves rightward in FIG. 22 as the trigger lever 109 turns. As a result of this operation, the driving pin 109b of the trigger lever 109 moves into the groove cam 21e. Due to this movement, the trigger rod 21 moves in the opposite direction to the disk inserting direction 5a and pushes in the cam rod 23 in the same direction, i.e., the opposite direction to the disk inserting direction 5a. This movement brings the rack 23m provided to the cam rod 23 into engagement with the driving pinion 34a. At this time, the trigger lever 109 is in the trigger position. Because the gear train 34, 34a, 33, 32, and 35 is rotated by the motor 24, the cam rod 23 further moves in the opposite direction to the disk inserting direction 5a via the rack 23m. As a result of this movement, the clamp lever 43 turns in a vertical direction to clamp the disk 100 in the disk mounted position. Specific operation of the cam rod 23 is similar to that in the first embodiment and therefore description of it will be omitted.

FIG. 23 shows a state in which clamping of the disk 100 has been completed. From the state in FIG. 22, if the cam rod 23 further moves in the opposite direction to the disk inserting direction 5a by driving of the motor 24, the pin 21f of the trigger rod 21 reaches the uppermost portion 23e while guided by the oblique portion 23d of the groove cam 23a. In a process of this movement, the pin 21f is pushed leftward in FIG. 23 in the oblique portion 23d and the trigger rod 21 also similarly moves leftward. Therefore, the cam 21g formed of the upper oblique side of trigger rod 21 in FIG. 7 pushes the turning shaft 108h of the right centering lever 108 upward. As a result, the right centering lever 108 turns counterclockwise about the turning shaft hole 108c as a center of turning and the trigger lever 109 turns clockwise about the driving pin 109b fitted in the groove cam 21e and therefore the contact pin 109a at a tip end moves away from the outer periphery of the disk 100.

Moreover, with this operation, the disk positioning pin 108a of the right centering lever 108 also moves away from the outer periphery of the disk 100. Furthermore, because the right centering lever 108 is coupled to the engaging hole 111b of the left centering lever 111 by the engaging pin 108b, the left centering lever 111 also turns clockwise about the turning shaft hole 111c and the contact pin 111a carries out operation for mounting the disk 100 to the turntable 47a. This operation is similar to that in the first embodiment and therefore description of it will be omitted.

When mounting of the disk 100 is completed, all levers in the groups are in an area outside the outer periphery of the disk 100, i.e., outside the large-diameter disk-mounted-area 1d and do not exist in the large-diameter disk-mounted-area 1d. As a result, the groups of levers can be formed at the same height as the disk 100 and it is possible to reduce a height of the disk loading device as compared with a disk loading device in which the groups of levers are disposed above the disk.

Next, operation when the small-diameter disk 120 of the standardized diameter of 8 cm is mounted in the disk loading device will be described with reference to FIGS. 24 to 28. A lateral width of the disk insertion slot 105 of the disk loading device is slightly longer than the diameter of the large-diameter disk 100. This means that the lateral width is much longer than the diameter of the small-diameter disk 120. Therefore, when a user inserts the disk 120 into the disk loading device, it is unknown which part of the insertion slot 5 the disk 120 is inserted into. For example, in an example shown in FIG. 24, the disk 120 is inserted into a left part of the insertion slot 105. In an example shown in FIG. 26, the disk 120 is inserted into a right part of the insertion slot 105.

In the disk loading device of the present embodiment, it is possible to position the disk 120 in the disk mounted position irrespective of which part of the insertion slot 105 the disk 120 is inserted.

Figure 24:
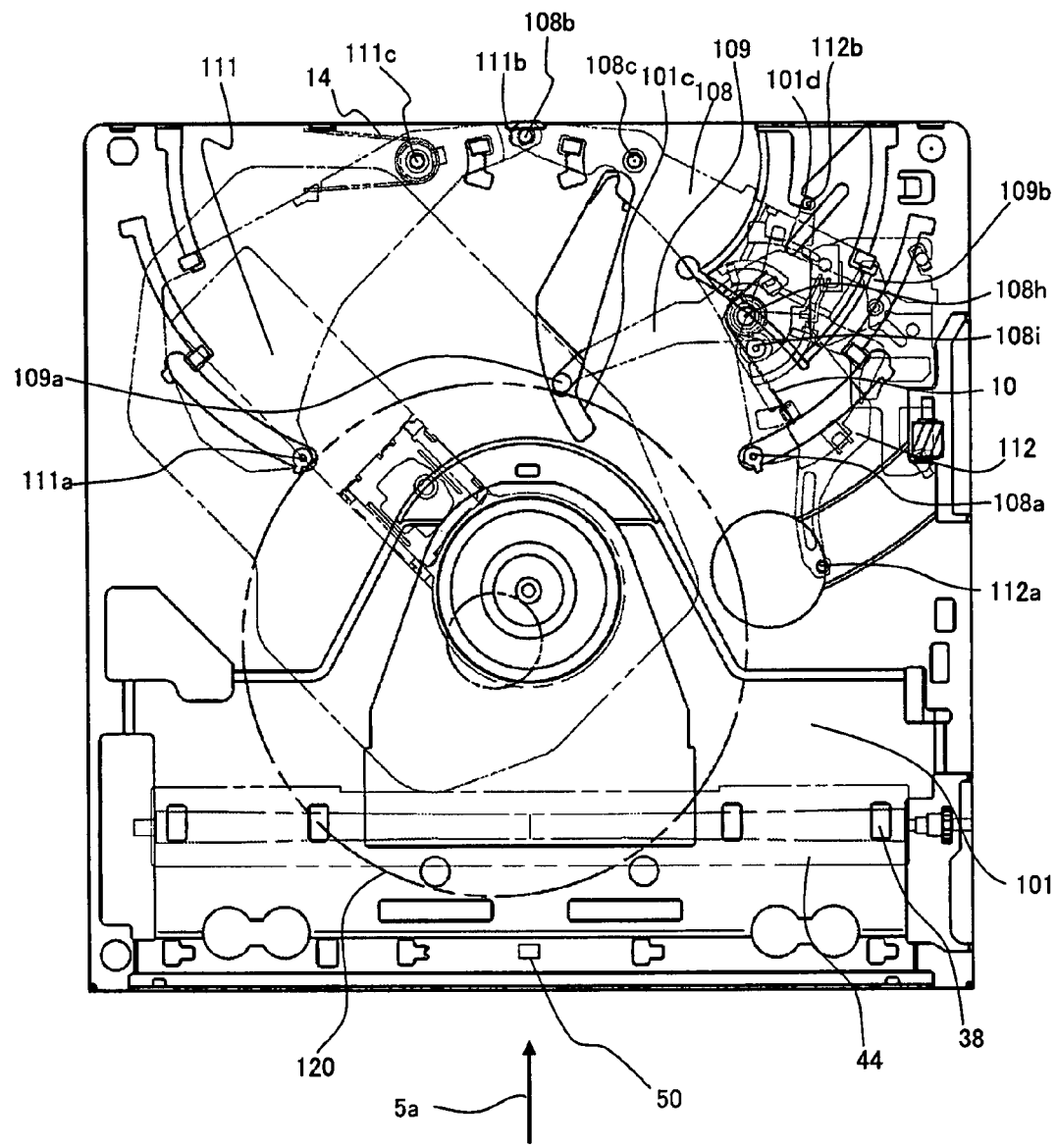
FIG. 24 is a partial top view when a small-diameter disk is inserted from a left side of an insertion slot in the disk loading device of the second embodiment of the present invention.
Figure 25:
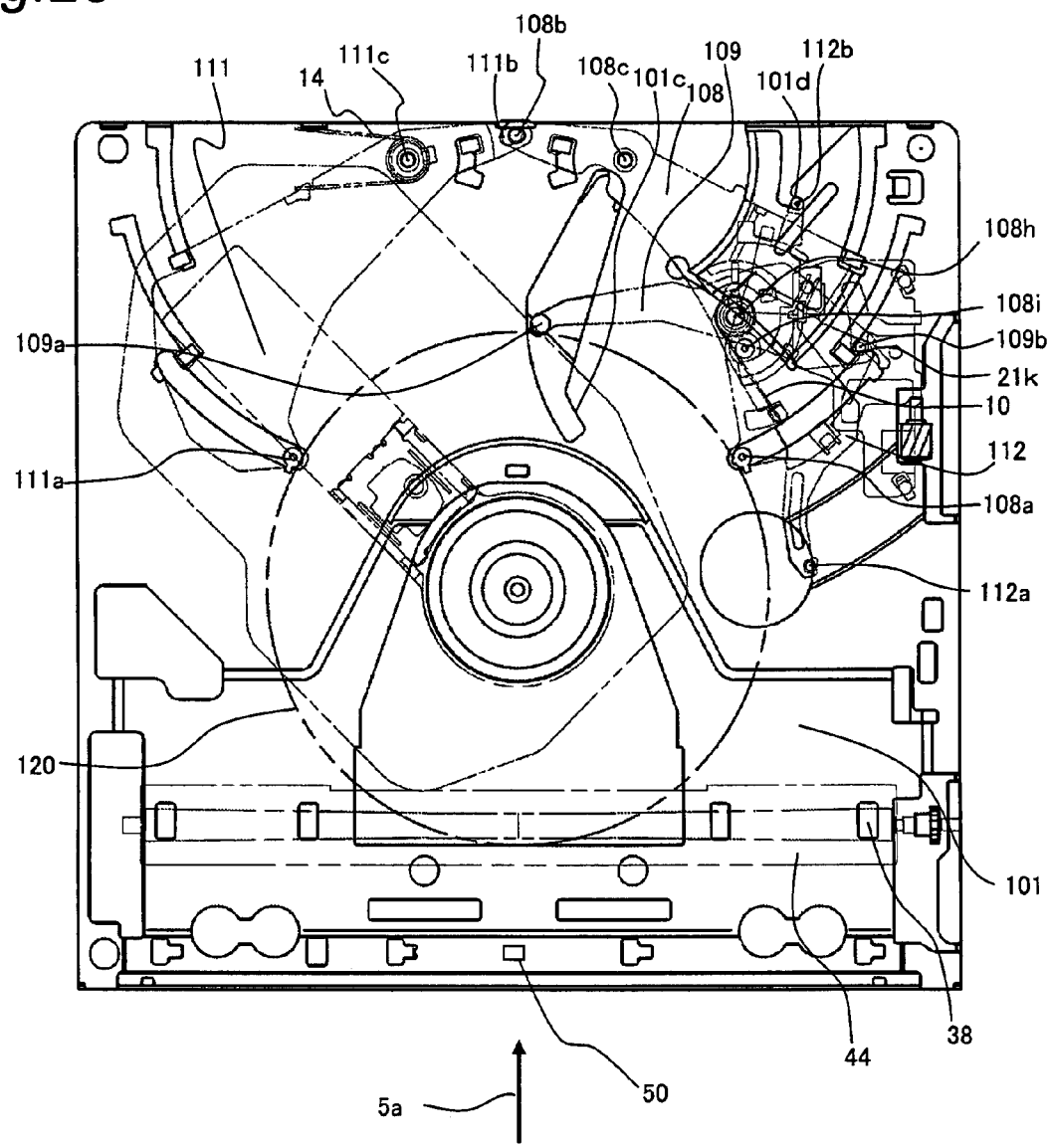
FIG. 25 is a partial top view showing a state of completion of disk positioning of the small-diameter disk in the disk loading device of the second embodiment of the present invention.

With reference to FIG. 24, operation when the disk 120 is inserted into the left part of the insertion slot 105 will be described. FIG. 24 shows a state in which the disk 120 has come in contact with the disk positioning pin 111a of the left centering lever 111 and the contact pin 109a of the trigger lever 109 after inserted from the insertion slot 5 and has turned the trigger lever 109 and the contact pin 109a has moved away from the restricting wall 101c of the sub chassis 101.

In FIG. 24, if the user inserts the disk 120 into the insertion slot 105, the switch 50 is closed and the motor 24 starts rotating before the disk 120 comes in contact with the rubber roller 38 similarly to the case of insertion of the large-diameter disk 100. The rotation of the motor 24 causes the rubber roller 38 to rotate. If the disk 120 is further pushed in, the disk 120 is sandwiched between the rotating rubber roller 38 and the guide rod 44 fixed to the clamp lever 43 and the disk 120 is conveyed (inserted) in the direction of the arrow 5a and enters the disk loading device.

The disk 120 first comes in contact with and pushes the disk positioning pin 111a of the left centering lever 111. The disk positioning pin 111a is pushed by the disk 120 and tries to turn clockwise in FIG. 24. However, the coupled right centering lever 108 is in a locked state because the contact pin 109a of the trigger lever 109 provided to the right centering lever 108 is restricted in its turning about the turning shaft 108c by the restricting wall 101c of the sub chassis 101. Therefore, the left centering lever 111 coupled to the right centering lever 108 by the engaging pin 108b is also in a locked state and the disk positioning pin 111a cannot turn.

As a result, the disk 120 is further inserted while moving rightward in FIG. 24 in contact with the disk positioning pin 111a.

If the disk 120 is further inserted, the disk 120 comes in contact with and pushes the contact pin 109a of the trigger lever 109 to turn the trigger lever 109 clockwise in FIG. 24. In this way, the contact pin 109a becomes detached from the restricting wall 101c. However, the disk 120 in this position is sufficiently far away from the contact pin 112a of the disk detecting lever 112 and is in a standby position. Therefore, the engaging pin 112b of the disk detecting lever 112 is restricted in its turning about the turning shaft 108c by the restricting wall 101d of the sub chassis 101, the right centering lever 108 provided with the disk detecting lever 112 stays in the locked state, and therefore the locked state of the left centering lever 111 also continues. If the inserting operation of the disk 120 further continues, the disk 120 further moves rightward in FIG. 24 and finally comes in contact with the disk positioning pin 108a to thereby complete the inserting operation.

FIG. 25 shows a state in which the inserting operation has been completed. Because the disk contact pin 112a of the disk detecting lever 112 is provided outside the small-diameter disk-mounted-area 1e, the pin 112a is away from the disk 120. Therefore, the disk detecting lever 112 stays in the initial state and the engaging pin 112b of the disk detecting lever 112 is restricted in its turning about the turning shaft hole 108c by the restricting wall 101d of the sub chassis 101. As a result, the right centering lever 108 provided with the disk detecting lever 112 stays in the locked state and the left centering lever 111 engaged and interlocked with the right centering lever 108 by the engaging pin 108b is also kept in the locked state. Because the right centering lever 108 is in the locked state, the turning shaft 108h does not move and is fixed. Therefore, the trigger lever 109 with its contact pin 109a pushed by the outer periphery of the disk 120 turns clockwise about the turning shaft 108h and the cam pin 109b provided on the opposite side to the contact pin 109a comes in contact with the entrance wall 21k (FIG. 14A) of the groove cam 21h from the groove cam 21c of the trigger rod 21 to move the trigger rod 21 in the opposite direction to the disk inserting direction 5a. Because the trigger rod 21 is restricted in its movement by the guide portion 20d provided to the support board 15 and therefore the trigger rod 21 is restricted in its movement and stops on its way. FIG. 25 shows the restricted state. Because the trigger rod 21 is restricted, the trigger lever 109 is also restricted in its turning operation and becomes impossible to turn any more and the contact pin 109a is also restricted in its movement there.

With the above operation, the disk 120 is positioned by the three pins, i.e., the disk positioning pins 108a, 111a, and the contact pin 109a.

If the disk 120 is inserted from the central part, the disk 120 is finally positioned by the three pins, i.e., the disk positioning pins 108a, 111a, and the contact pin 109a in the state shown in FIG. 25 by the similar operation.

Figure 26:
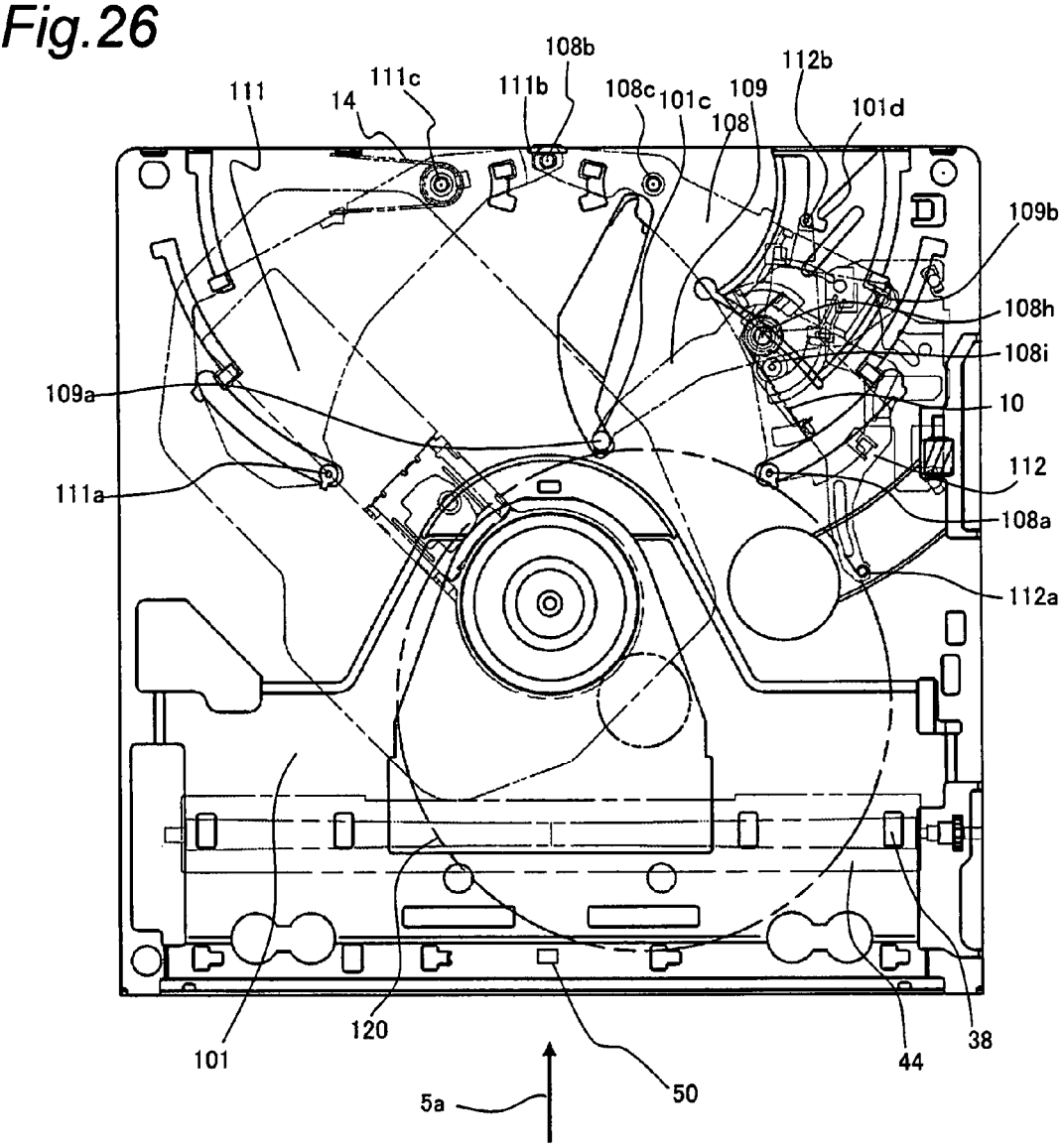
FIG. 26 is a partial top view when the small-diameter disk is inserted from a right side of the insertion slot in the disk loading device of the second embodiment of the present invention.

Next, with reference to FIG. 26, operation when the disk 120 is inserted into the right part of the insertion slot 105 will be described. The inserted disk 120 first comes in contact with the contact pin 112a of the disk detecting lever 112 to turn the disk detecting lever 112 counterclockwise about the turning shaft 108i. As a result of this turning, the engaging pin 112b of the disk detecting lever 112 becomes detached from the restricting wall 101d of the sub chassis 101. If the disk 120 is further inserted, the disk 120 comes in contact with the disk positioning pin 108a of the right centering lever 108. The disk positioning pin 108a does not move because the disk positioning pin 108a is restricted in its turning about the turning shaft hole 108c by engagement between the contact pin 109a of the trigger lever 109 and the restricting wall 101c of the sub chassis 101. Therefore, the disk 120 moves to the upper left in FIG. 26 while in contact with the disk positioning pin 108a.

Figure 27:
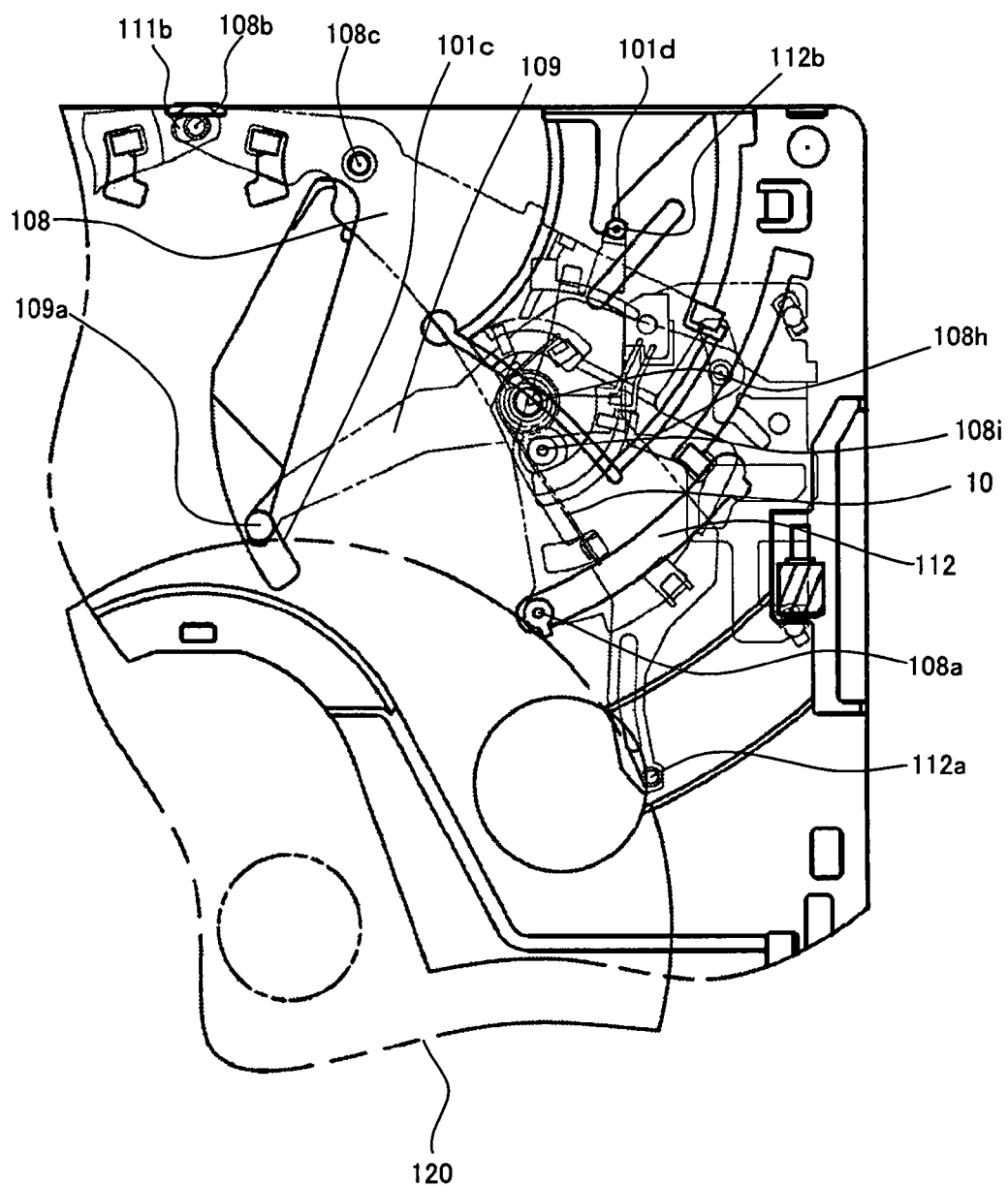
FIG. 27 is a partial top view showing another state when the small-diameter disk is inserted from the right side of the insertion slot in the disk loading device of the second embodiment of the present invention.

FIG. 27 shows a state in which the disk 120 is further inserted. If the disk 120 is further inserted, the disk 120 comes in contact with the contact pin 109a and moves while pushing the pin 109a. As the disk 120 moves, the contact pin 109a of the trigger lever 109 becomes detached from the restricting wall 101c. However, as the disk 120 moves to the left (the central portion), the contact pin 112a of the disk detecting lever 112 is returned to its original state along the outer periphery of the disk 120 by the biasing spring 10. FIG. 27 shows a state of the instant at which the contact pin 109a moves away from the restricting wall 101c. At this time, the engaging pin 112b of the disk detecting lever 112 has returned to such a position as to be restricted by the restricting wall 101d. Therefore, even if the contact pin 109a of the trigger lever 109 becomes completely detached from the restricting wall 101c, the right centering lever 108 is kept in the locked state by the engaging pin 112b and the left centering lever 111 engaged with the right centering lever 108 is similarly kept in the locked state. If the inserting operation of the disk 120 is further continued, the disk 120 moves rightward in FIG. 27 and finally comes in contact with the disk positioning pin 108a to complete the inserting operation and come into the state shown in FIG. 25.

At this time, similarly to the above-described case in which the disk is inserted from the left side of the insertion slot 5, the disk 120 is positioned by the tree pins, i.e., the disk positioning pin 108a of the right centering lever 108, the disk positioning pin 111a of the left centering lever 111, and the contact pin 109a of the trigger lever 109.

As described above, because the contact pin 109a of the trigger lever 109 and the engaging pin 112b of the disk detecting lever 112 do not simultaneously become detached from the restricting walls 101c, 101d and either one of them locks the right centering lever 108, the disk 120 is positioned without going too far due to opening of the right centering lever 108. Therefore, it is possible to prevent the disk 120 from dropping in the disk loading device and becoming impossible to come out.

Moreover, the trigger lever 109 for positioning the disk 120 in cooperation with the right centering lever 108 and the left centering lever 111 and the disk detecting lever 112 for locking the right centering lever 108 are mounted to the right centering lever 108. In this way, the turning shaft 108h of the trigger lever 109 is accurately fixed by the disk detecting lever 112 to thereby enhance positional accuracy of the contact pin 109a of the trigger lever 109. As a result, positioning accuracy of the disk 120 is enhanced to thereby prevent occurrence of seating errors.

Moreover, the restricting walls 101c, 101d for locking the disk detecting lever 112 and the trigger lever 109 are provided to the sub chassis 101 provided with the right centering lever 108 and the left centering lever 111. As a result, because there is no error in mounting the sub chassis 101 and the support board 15 to each other, centering accuracy of the disk 120 can be enhanced and seating errors can be avoided.

Furthermore, engagement between the trigger lever 109 and the restricting wall 101c is carried out by the contact pin 109a that comes in contact with the disk 120. As a result, it is possible to more accurately lock the right centering lever 108 in an appropriate position to thereby enhance accuracy of the disk detecting lever 112 with respect to the restricting wall 101d. Therefore, it is possible to prevent simultaneous unlocking of the trigger lever 109 and the disk detecting lever 112 to thereby stably carry out locking of the right centering lever 108.

Figure 28:
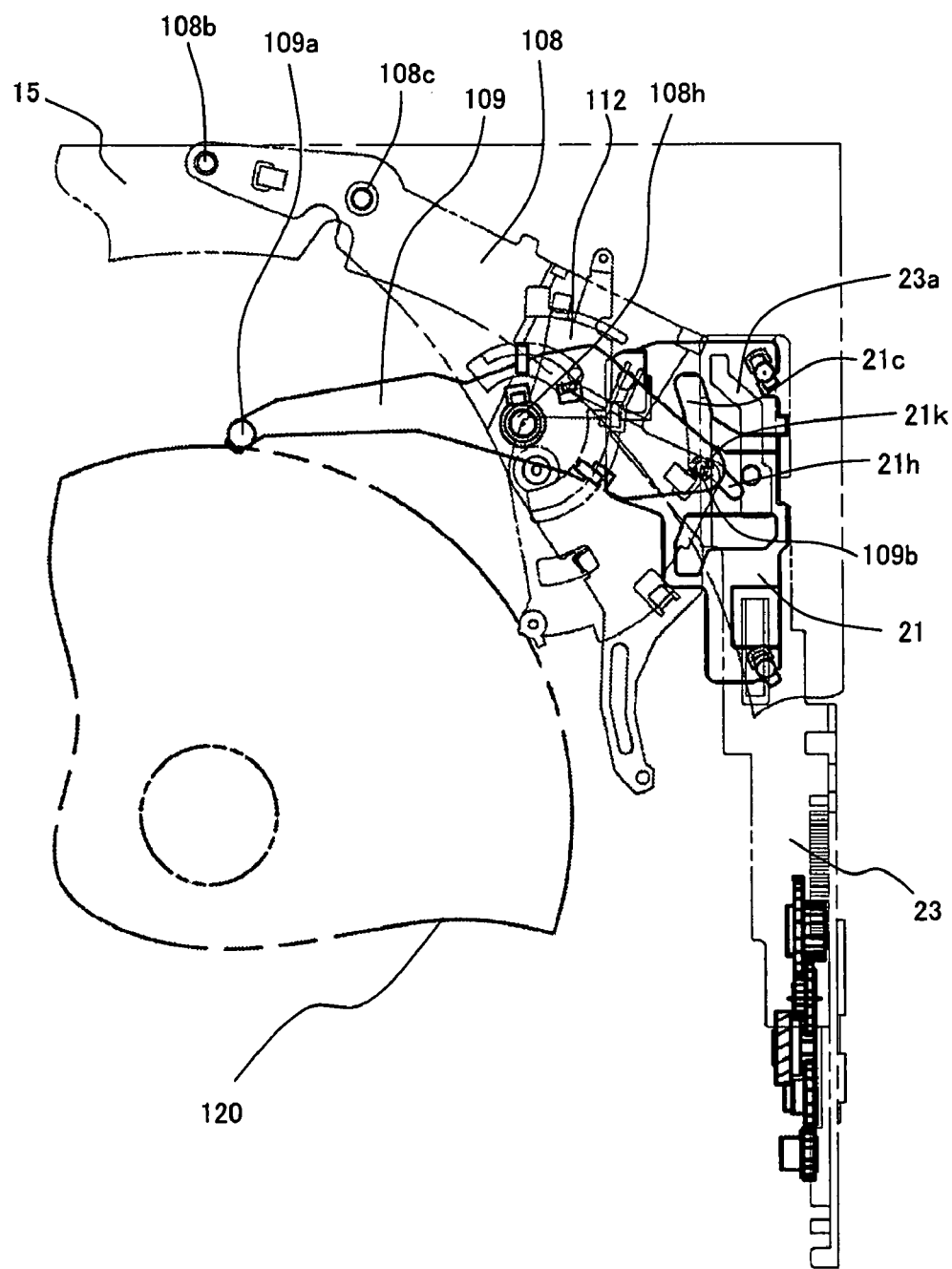
FIG. 28 is a partial top view showing operation of the trigger rod during insertion of the small-diameter disk in the disk loading device of the second embodiment of the present invention.

Next, operation of the trigger lever 109 immediately before the state in FIG. 25 after the final positioning has been carried out in the above-described positioning operation of the disk 120 will be described with reference to FIG. 28. Due to turning of the trigger lever 109, the driving pin 109b of the trigger lever 109 moves from the groove cam 21c to the entrance wall 21k of the groove cam 21h to push the trigger rod 21 in the opposite direction to the disk inserting direction 5a. As a result, the guide pins 21a, 21b move from the upper ends to the lower ends of the oblique guide portions 20c of the guide holes 20a, 20b against the biasing force of the biasing pin 22. Thus, as shown in FIG. 14A, the end face 21j of the trigger rod 21 pushes the pin 23b of the cam rod 23 in the same direction, i.e., the opposite direction to the disk inserting direction 5a and the cam rod 23 moves downward in FIG. 28. Consequently, the rack 23m provided to the cam rod 23 becomes engaged with the driving pinion 34a similarly to the above-described case of the large-diameter disk 100. At this time, the trigger lever 109 is in the trigger position. Because the driving pinion 34a is driven by the motor 24, the driving pinion 34a further moves the cam rod 23 in the opposite direction to the disk inserting direction 5a and, as a result, the pin 21f reaches the uppermost portion 23e while guided by the oblique portion 23d of the groove cam 23a. In the process of this movement, the pin 21f is pushed leftward by the oblique portion 23d and therefore the trigger rod 21 similarly moves leftward. As a result of this movement, the driving pin 109b turns clockwise about the turning shaft 108h while guided by the oblique portion 23d of the groove cam 21c. Thus, the contact pin 109a turns clockwise to move away from the outer periphery of the disk 120. In other words, the trigger lever 109 moves to the retreat position.

Each of the disk positioning pins 108a and 111a has a small-diameter portion and a large-diameter portion having a greater diameter than the small-diameter portion similarly to the disk positioning pins 8a and 11a in the first embodiment. When the disk 120 is clamped, it is possible to create clearances between the disk 120 and the small-diameter portions of the disk positioning pins 108a, 111a so as to prevent them from contact with each other. Therefore, rotation of the disk 120 is not obstructed during recording on and playback of the disk 120.

Because the operation for mounting the disk 120 onto the turntable 47a is similar to that in the first embodiment, description thereof will be omitted.

Description of operation for taking the mounted disk 100 or 120 out of the disk loading device will be omitted.

With the second embodiment of the present invention, when the large-diameter disk 100 is mounted in the disk loading device, all components of the disk positioning mechanism including the right centering lever 108, the trigger lever 109, the left centering lever 111, and the disk detecting lever 112 for positioning the disk 100 are outside the mounted area 1d of the disk 100 and the mechanism can be formed at the same height as the disks 100, 120. Therefore, it is possible to reduce a thickness of the disk loading device (slimming down) as compared with a disk loading device in which the disk positioning mechanism is disposed above the disk 100 or 120.

In the second embodiment of the present invention, because the disk detecting lever 112 and the trigger lever 109 are provided on the same lever (right centering lever 108), the biasing spring 10 can be shared and it is possible to reduce cost. Even if rigidity of the right centering lever 108 and the left centering lever 111 is low, the right centering lever 108 provided with the trigger lever 109 is directly locked by the disk detecting lever 112 and therefore it is possible to avoid a situation in which the right centering lever 108 is bent by force applied in conveying the disk 120 and the turning shaft 108h of the trigger lever 109 moves. Thus, positioning accuracy of the disk 120 is enhanced to thereby prevent occurrence of seating errors. Moreover, the right centering lever 108 and the left centering lever 111 can be made of inexpensive low-rigidity material to thereby reduce cost.

Figure 29:
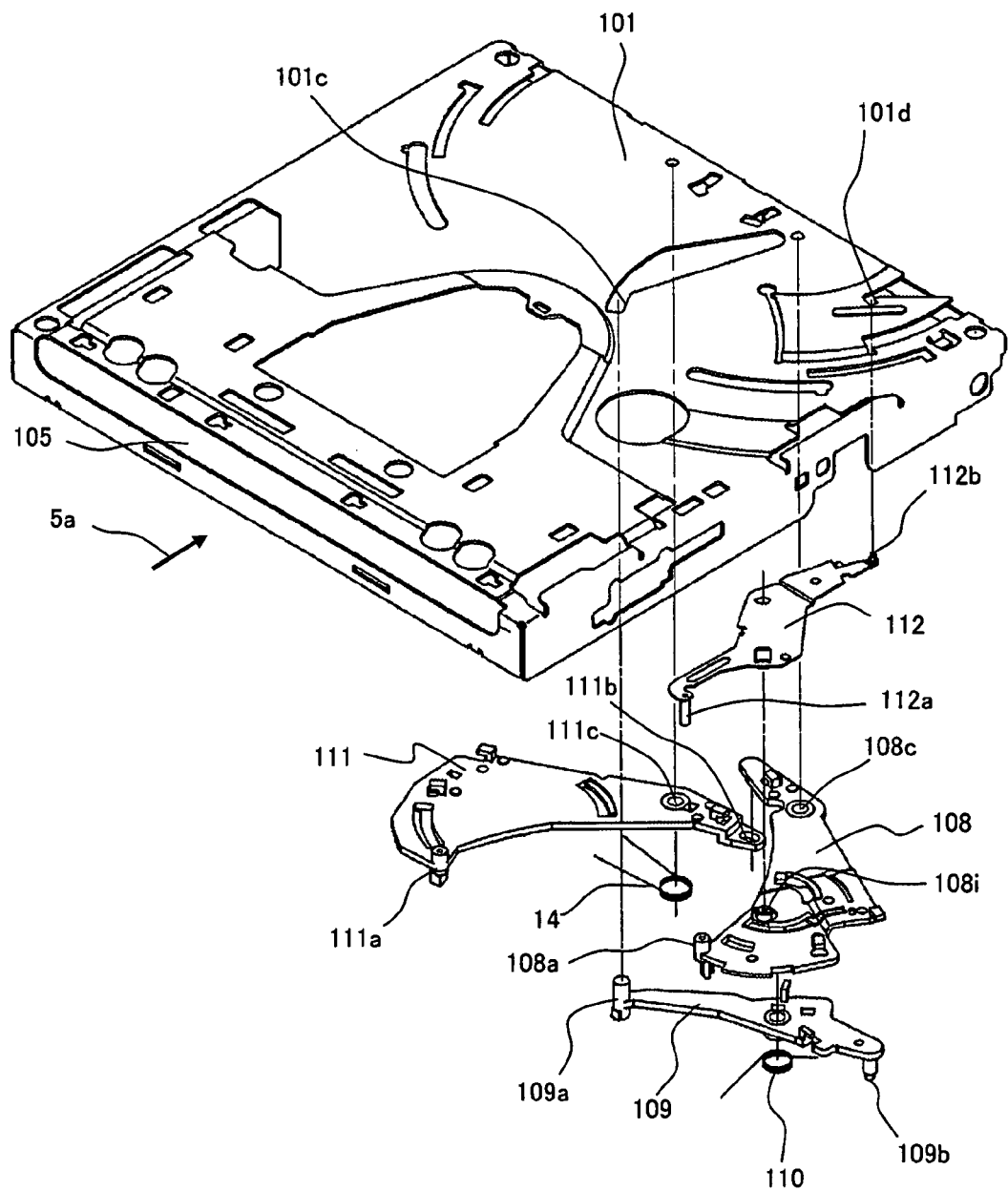
FIG. 29 is an exploded perspective view for explaining parts provided to a sub chassis in the disk loading device of the second embodiment of the present invention.

Furthermore, in the second embodiment of the present invention, the restricting walls 101c, 101d for locking the disk detecting lever 112 and the trigger lever 109 are provided to the sub chassis 101 provided with the right centering lever 108 and the left centering lever 111. In other words, as shown in FIG. 29, all of the disk detecting lever 112, the trigger lever 109, the right centering lever 108, the left centering lever 111, and the restricting portions 101c, 101d are provided to the sub chassis 101. As a result, because there is no error in mounting the sub chassis 101 and the support board 15 to each other, centering accuracy of the disk 120 can be enhanced and seating errors can be avoided. The same effect can be obtained by providing all of the disk detecting lever 112, the trigger lever 109, the right centering lever 108, the left centering lever 111, and the restricting portions 101c, 101d to the support board 15.

Moreover, in the second embodiment, the contact pin 109a of the trigger lever 109 that comes in contact with the outer periphery of the disk 120 is engaged with the restricting wall 101c. As a result, it is possible to more accurately lock the right centering lever 108 in an appropriate position to thereby enhance accuracy of the disk detecting lever 112 with respect to the restricting wall 101d. Therefore, it is possible to stably carry out locking of the right centering lever 108 to thereby improve the quality.

The present invention is not limited to the above respective embodiments but can be carried out in other various embodiments. For example, though the right centering lever (8, 108), the trigger lever (9, 109), the left centering lever (11, 111), and the disk detecting lever (12, 112) are supported by their respective shafts and move by rotating operation in the above respective embodiments, these components may be configured to perform rectilinear movement (linear operation) with slide mechanisms or linkages.

Although the engaging pin (8b, 108b) of the right centering lever (8, 108), the engaging pin (9a, 109a) and the driving pin (9b, 109b) of the trigger lever (9, 109), the engaging hole (11b, 111b) of the left centering lever (11, 111), and the disk detecting pin (12a, 112a) of the disk detecting lever (12, 112) are provided at the tip ends or the end portions of the respective levers, the present invention is not limited to it. They may be provided in any positions of respective levers as long as they can perform respective functions.

By properly combining arbitrary embodiments of the above-described various embodiments, their effects can be exerted.

The present invention is effective as a thin disk loading device for both the large-diameter disk and small-diameter disk.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A disk loading device, for use with a large-diameter disk and a small diameter disc, said disk loading device comprising:

a traverse including a turntable for mounting the large-diameter disk or the small-diameter disk;

a large-diameter disk-mounted-area which is an area where the mounted large-diameter disk, including an outermost circumference of the large-diameter disk, exists when the large-diameter disk is mounted to the turntable;

a first board parallel to the large-diameter disk-mounted area and having an opening at a portion facing the large-diameter disk-mounted area such that an upper face of a disk mounted on the turntable is exposed by the opening;

a second board combined with the first board to form a housing;

a first positioning lever which is movably mounted to one of the first and second boards outside, in a radial direction, an outermost circumference of the large-diameter disk-mounted-area;

a first detecting lever which is movably mounted to the first positioning lever;

a second positioning lever which is movably mounted to one of the first and second boards outside, in a radial direction, the outermost circumference of the large-diameter disk-mounted-area; and a second detecting lever which is movably mounted to the second positioning lever, the first and second positioning levers each comprising a disk positioning portion, and each being movable from a position in which the disk positioning portion protrudes inside the outermost circumference of the large-diameter disk-mounted-area when no disk is mounted on the turntable, and a position where the entirety of the positioning levers, including the disk positioning portions, is outside, in a radial direction, the outermost circumference of the large-diameter disk-mounted area, the first and second detecting levers each comprising a disk detecting portion, and each being movable from a position in which the disk detecting portion protrudes inside the outermost circumference of the large-diameter disk-mounted-area when no disk is mounted on the turntable, and a position where the entirety of the detecting levers, including the disk detecting portions, is outside, in a radial direction, the outermost circumference of the large-diameter disk-mounted area, wherein the first and second positioning levers position the small-diameter disk in a disk mounted position in a case of mounting the small-diameter disk to the turntable, and the first and second positioning levers are pushed by the large-diameter disk, and the entirety of all the levers including the first and second positioning levers and the first and second detecting levers move outside, in a radial direction, the outermost circumference of the large-diameter disk-mounted-area when the disk detecting portions of both of the first and second detecting levers detect the large-diameter disk in a case of mounting the large-diameter disk to the turntable.

2. A disk loading device according to claim 1, wherein the first and second positioning levers are in locked states when no disk is mounted, and both of the first and second positioning levers are released from the locked states thereof to become movable due to movements of the first and second detecting levers only when both of the first and second detecting levers are pushed by the large-diameter disk inserted into the disk loading device and both of the first and second detecting levers move.

3. A disk loading device according to claim 1, wherein the first and second positioning levers are made movable during movement of one of the first and second detecting levers from an initial position to a trigger position, while interlocking with this movement, and a driving mechanism for clamping the disk on the turntable is driven during the movement of one of the first and second detecting levers from the trigger position to a retreat position outside, in a radial direction, the outermost circumference of the large-diameter disk-mounted-area, while interlocking with this movement, in the movement of one of the first and second detecting levers at the time of insertion of the large-diameter disk.

4. A disk loading device, for use with a large-diameter disk and a small diameter disc, said disk loading device comprising:

a traverse including a turntable for mounting the large-diameter disk or the small-diameter disk;

a large-diameter disk-mounted-area which is an area where the mounted large-diameter disk, including an outermost circumference of the large-diameter disk, exists when the large-diameter disk is mounted to the turntable;

a first board parallel to the large-diameter disk-mounted area;

a second board combined with the first board to form a housing;

a first positioning lever and a second positioning lever which are rotatably supported by turning shafts on one of the first and second boards and linked so as to be interlockingly rotated with each other outside, in a radial direction, an outermost circumference of the large-diameter disk-mounted-area;

at least one first detecting lever provided to at least one of the first positioning lever and the second positioning lever, respectively, to be able to turn, and having a first engaging portion which is engaged with a first restricting portion provided to the first board or the second board; and at least one second detecting lever provided to the first positioning lever or the second positioning lever that is provided with the first detecting lever to be able to turn, and having a second engaging portion which is engaged with a second restricting portion provided to the first board or the second board, the first and second positioning levers each comprising a disk positioning portion, and each being movable from a position in which the disk positioning portion protrudes inside the outermost circumference of the large-diameter disk-mounted-area when no disk is mounted to the turntable, and a position where the entirety of the positioning levers, including the disk positioning portions, is outside, in a radial direction, the outermost circumference of the large-diameter disk-mounted area, the first and second detecting levers each comprising a disk detecting portion, and each being movable from a position in which the disk detecting portion protrudes inside the outermost circumference of the large-diameter disk-mounted-area when no disk is mounted on the turntable, and a position where the entirety of the detecting levers, including the disk detecting portions, is outside, in a radial direction, the outermost circumference of the large-diameter disk-mounted area, wherein the first and second positioning levers position the small-diameter disk in a disk mounted position by the third and fourth positioning levers in a case of mounting the small-diameter disk to the turntable, the first restricting portion and the second restricting portion are disengaged from the first engaging portion and the second engaging portion in the first detecting lever and the second detecting lever, the first and second positioning levers are pushed by the large-diameter disk, and the entirety of all the levers including the first and second positioning levers and the first and second detecting levers move outside, in a radial direction, the outermost circumference of the large-diameter disk-mounted-area when the disk detecting portions of both of the first and second detecting levers detect the large-diameter disk in a case of mounting the large-diameter disk to the turntable.

5. A disk loading device according to claim 4, wherein cancellation of engagement between the first engaging portion and the first restricting portion and cancellation of engagement between the second engaging portion and the second restricting portion are not simultaneously carried out in the first and second detecting levers so that the first and second positioning levers which are linked with each other do not move, and the small-diameter disk is positioned in the disk mounted position without moving the first and second positioning levers, in the case of mounting the small-diameter disk to the turntable.

6. A disk loading device according to claim 4, wherein a part of the second detecting lever protrudes inside a small-diameter disk-mounted area which is an area where the mounted small-diameter disk mounted to the turntable exists and the part of the second detecting lever drives a driving mechanism for clamping the large-diameter disk or the small-diameter disk on the turntable during movement of the second detecting lever from a trigger position to a retreat position outside, in a radial direction, the outermost circumference of the large-diameter disk-mounted-area at the time of insertion of the large-diameter disk or during movement of the second detecting lever from the trigger position to a retreat position outside, in a radial direction, an outermost circumference of the small-diameter disk-mounted area at the time of insertion of the small-diameter disk.

7. A disk loading device according to claim 4, wherein the first positioning lever, the second positioning lever, the first restricting portion, and the second restricting portion are provided to the first board or the second board.

8. A disk loading device according to claim 6, wherein the first positioning lever, the second positioning lever, the first restricting portion, and the second restricting portion are provided to the first board or the second board.

* * * * *